United States Patent
Roedler et al.

(10) Patent No.: US 12,205,057 B1
(45) Date of Patent: Jan. 21, 2025

(54) ASSIGNING SENTRY DUTY TASKS TO OFF-DUTY FIRST RESPONDERS

(71) Applicant: ALLsafeAPP USA LLC, Atlanta, GA (US)

(72) Inventors: Kyle H. Roedler, Watkinsville, GA (US); Ann Spears Roedler, Watkinsville, GA (US)

(73) Assignee: ALLsafeAPP USA LLC, Atlanta, GA (US)

( * ) Notice: Subject to any disclaimer, the term of this patent is extended or adjusted under 35 U.S.C. 154(b) by 0 days.

(21) Appl. No.: 18/411,123

(22) Filed: Jan. 12, 2024

(51) Int. Cl.
  *G06Q 10/0631* (2023.01)
(52) U.S. Cl.
  CPC ............................ *G06Q 10/06311* (2013.01)
(58) Field of Classification Search
  None
  See application file for complete search history.

(56) References Cited

U.S. PATENT DOCUMENTS

| | | | | |
|---|---|---|---|---|
| 10,984,496 B1 * | 4/2021 | Rabb | | A61B 6/5294 |
| 11,100,785 B1 * | 8/2021 | Cougar | | G08B 25/006 |
| 2010/0138096 A1 * | 6/2010 | Hung | | G05D 1/0274 |
| | | | | 701/25 |
| 2013/0198019 A1 * | 8/2013 | Smith | | G06Q 20/3278 |
| | | | | 705/17 |
| 2014/0162598 A1 * | 6/2014 | Villa-Real | | G07F 7/0886 |
| | | | | 455/411 |
| 2020/0294375 A1 * | 9/2020 | Branscomb | | G08B 13/1965 |
| 2020/0314623 A1 * | 10/2020 | Pellegrini | | H04W 4/90 |
| 2021/0314756 A1 * | 10/2021 | Brooks | | H04W 4/90 |
| 2021/0398434 A1 * | 12/2021 | Madden | | G08G 1/0955 |
| 2023/0315128 A1 * | 10/2023 | Bradley | | G05D 1/12 |
| | | | | 701/2 |

(Continued)

FOREIGN PATENT DOCUMENTS

| | | | | |
|---|---|---|---|---|
| GB | 2508705 A | * | 6/2014 | ............. G06Q 20/08 |
| WO | WO-2020257075 A1 | * | 12/2020 | ..... G06Q 10/063112 |

OTHER PUBLICATIONS

Tyshchuk et al., Social Media and Warning Response Impacts in Extreme Events: Results from a Naturally Occurring Experiment (Year: 2012).*

(Continued)

*Primary Examiner* — Mohamed N El-Bathy
(74) *Attorney, Agent, or Firm* — H. Brock Kolls

(57) ABSTRACT

The present invention relates to a method of assigning sentry duty tasks to off-duty first responders. The method includes entering and storing persons of attendance into a watchful record. Then, in operation, scanning and processing the social media of the persons of attendance looking for future event warning signs. Responsive to the future event warning signs and associated threat level generating a sentry duty task that includes a date, a time, a duration, a watch area, the future event warning sign, the first responder need, the threat level, a pay amount, or other items. First responders can accept, schedule, and execute the sentry duty task during their off-duty hours. Upon executed sentry duty task the first responder is electronically paid. Other exemplary embodiments include venue administrators creating a future event warning sign based on a known need, things that they are aware of or observe, or for other reasons.

18 Claims, 17 Drawing Sheets

(56) References Cited

U.S. PATENT DOCUMENTS

2023/0353982 A1* 11/2023 Routt ............... G06N 3/045
2024/0202772 A1* 6/2024 Presley ............ G06F 16/9536

OTHER PUBLICATIONS

Mou et al., Design of Multi-platforms Sensor Management System for UAV Autonomous Detection and Perception (Year: 2020).*
Diallo et al., Using Spatial Indexing Systems to Optimize Emergency Response Routes (Year: 2023).*

* cited by examiner

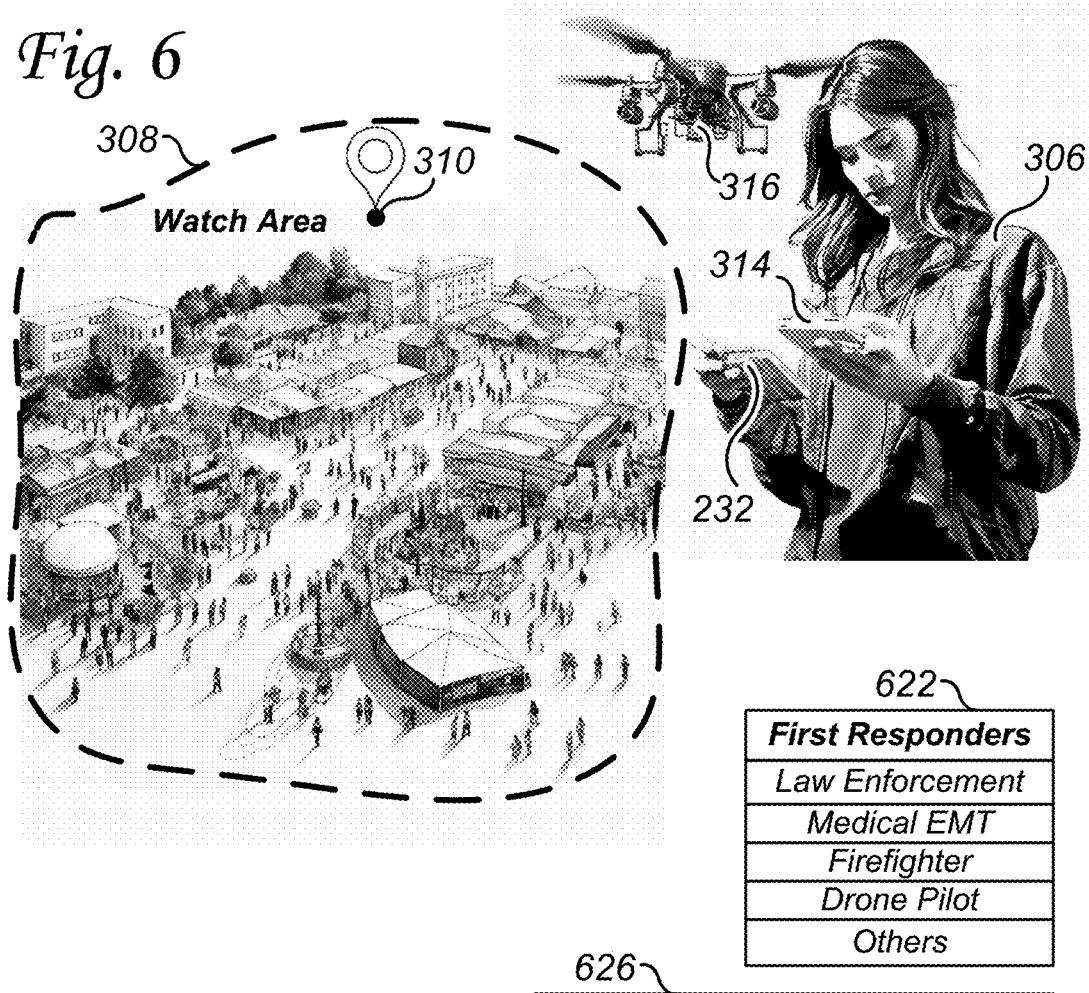

| First Responders |
|---|
| Law Enforcement |
| Medical EMT |
| Firefighter |
| Drone Pilot |
| Others |

| Threat Levels |
|---|
| Level 1 – Drugs / Non-Lethal Weapons |
| Level 2 – Fighting / Crowd Control |
| Level 3 – Rumors / Violent Online Posts Or Verbal Threat Of Violence |
| Level 4 – Lethal Weapon On Campus / Verified By School |
| Level 5 – Weapon In Hand Of Bad Actor Attempting To Harm NOW |
| Others |

| Future Event Warning Signs (Social Media Content) |
|---|
| 1 – Text With Certain Violent Or Disturbing Threats / Key Bully Intimidating Phrases Or Words |
| 2- Pictures Of Blood, Gore, Weapons, Gang Activity, Or Nudity |
| 3 – Videos Or Captions Of Violent Or Disturbing Messages Or Images |
| 4 – Parade Routes, Building Plans, Site Logistics, Public Event Threats With School, Kids, Or Teachers Planning On Attending |
| 6 – Unauthorized Motion Of Firearm/Weapon/Chemical, Medicine/Or Other Items Air-Taged |
| Others |

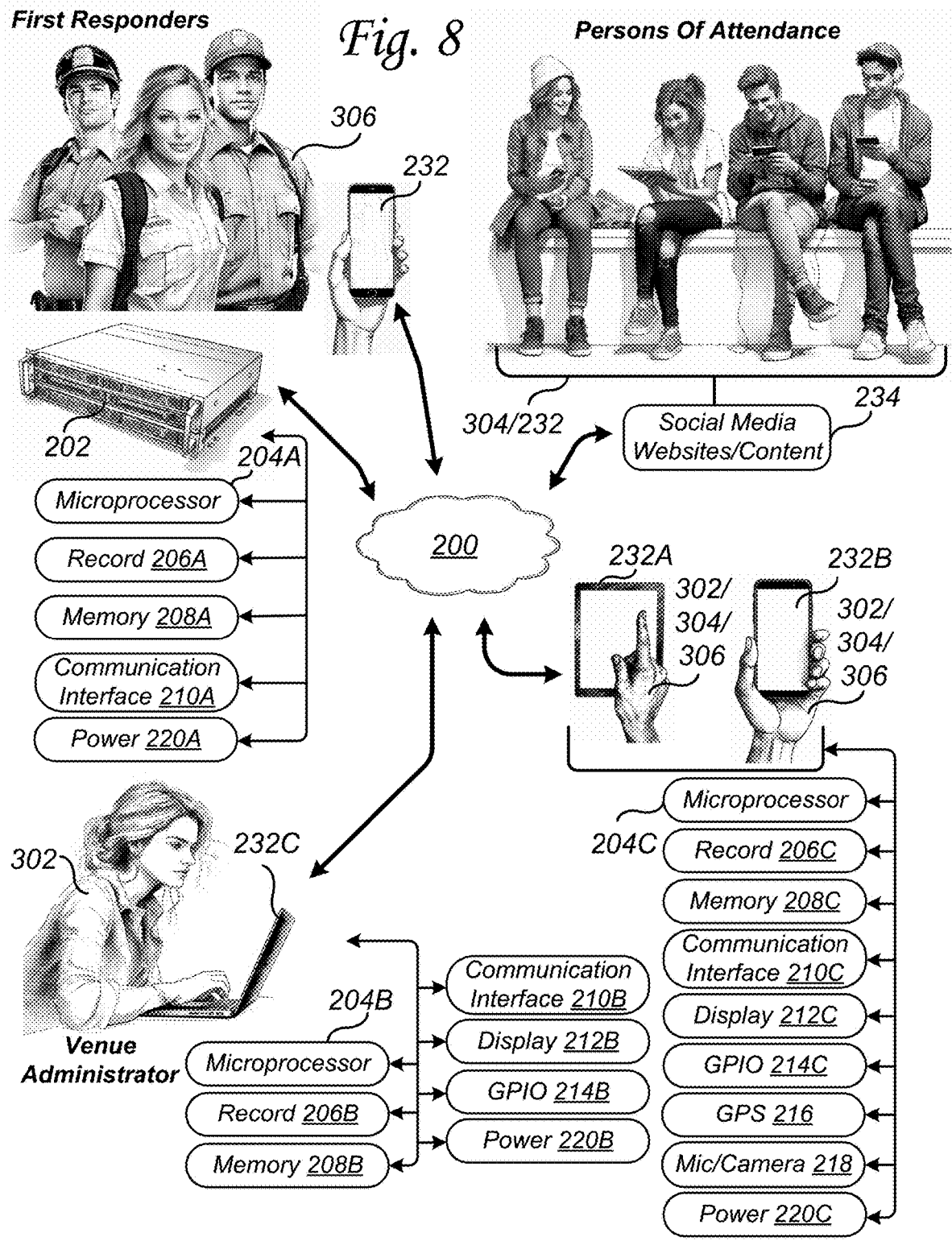

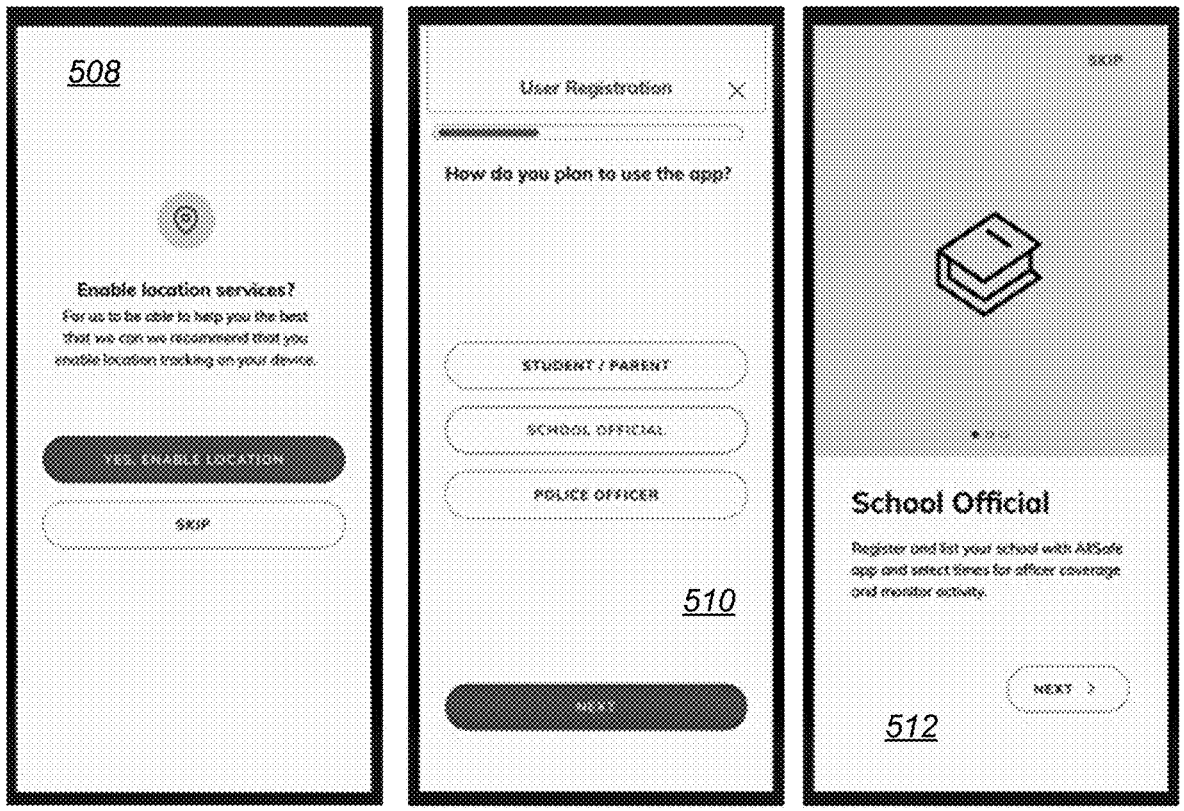
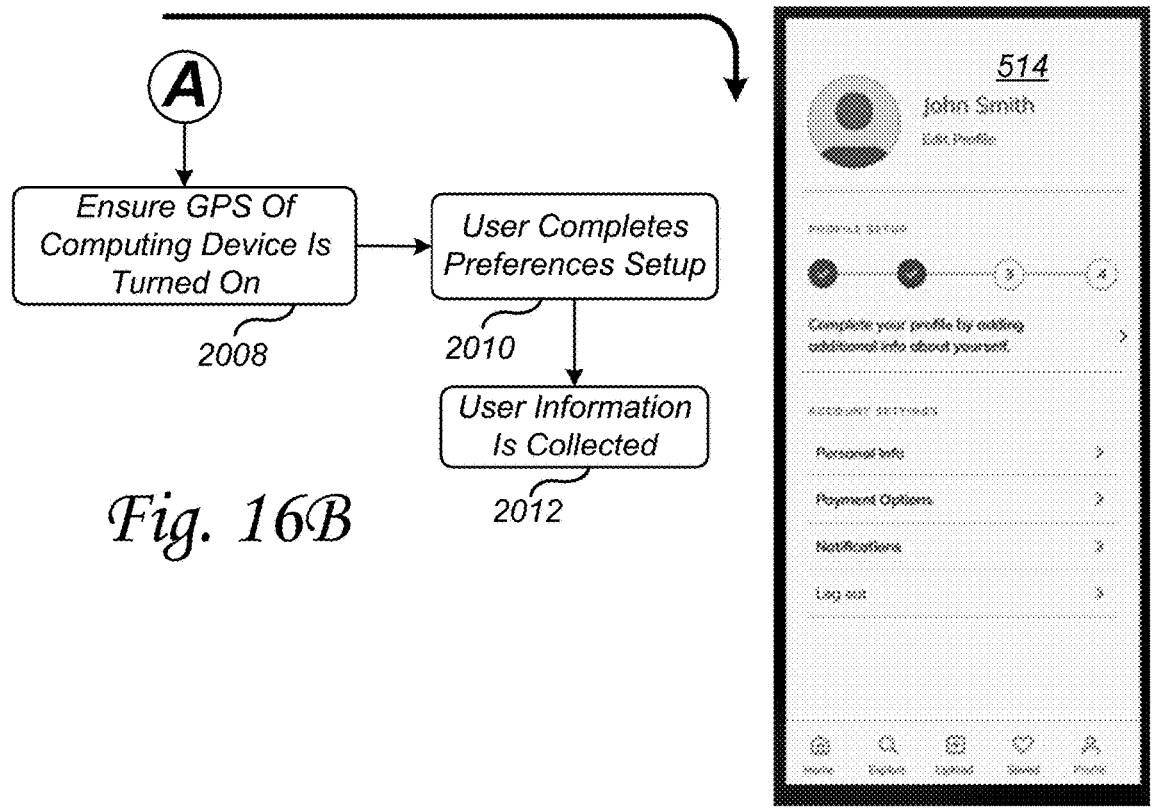
Fig. 16B

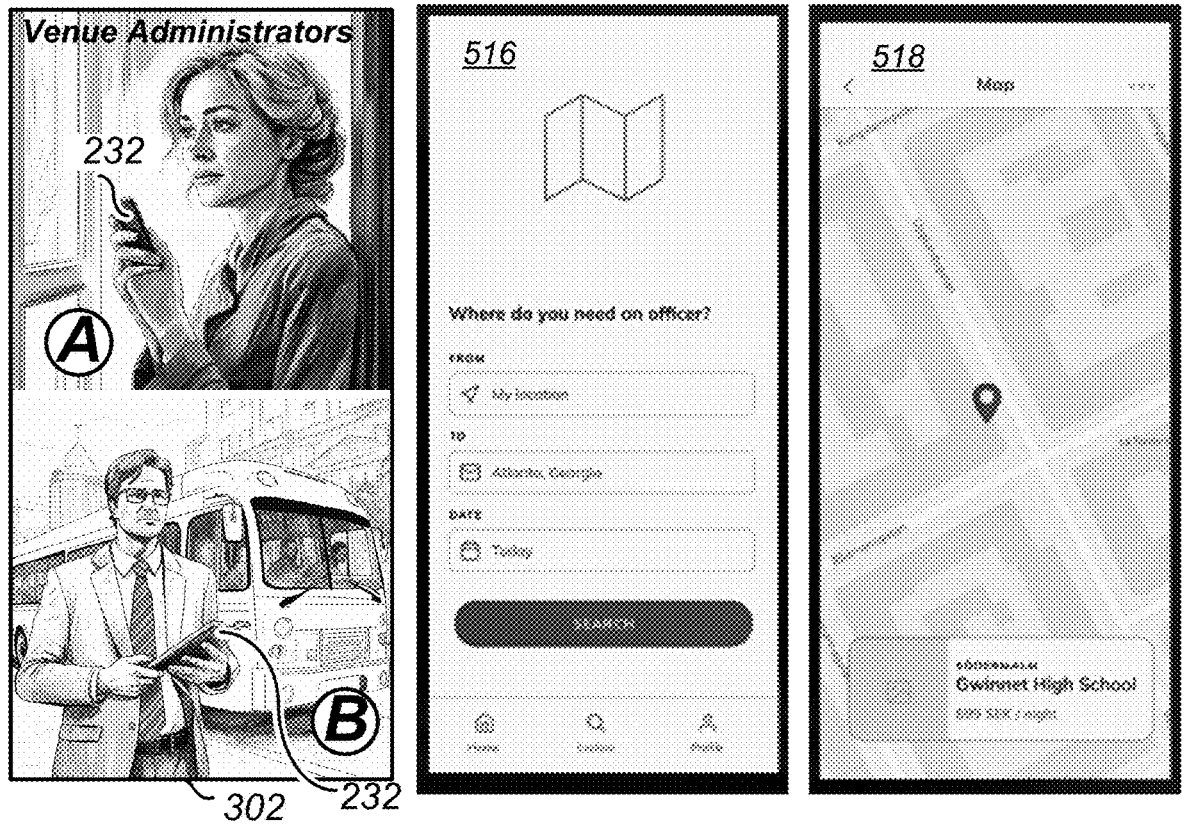
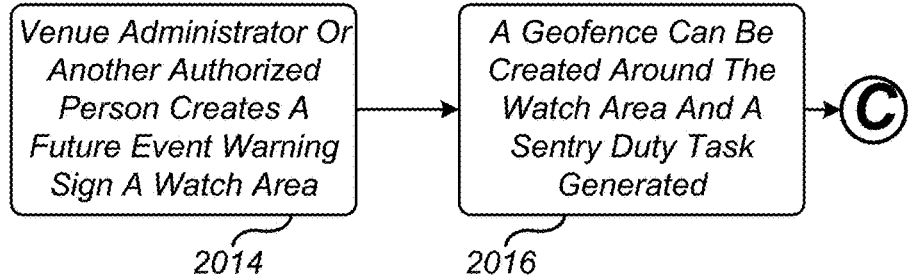
Fig. 17A

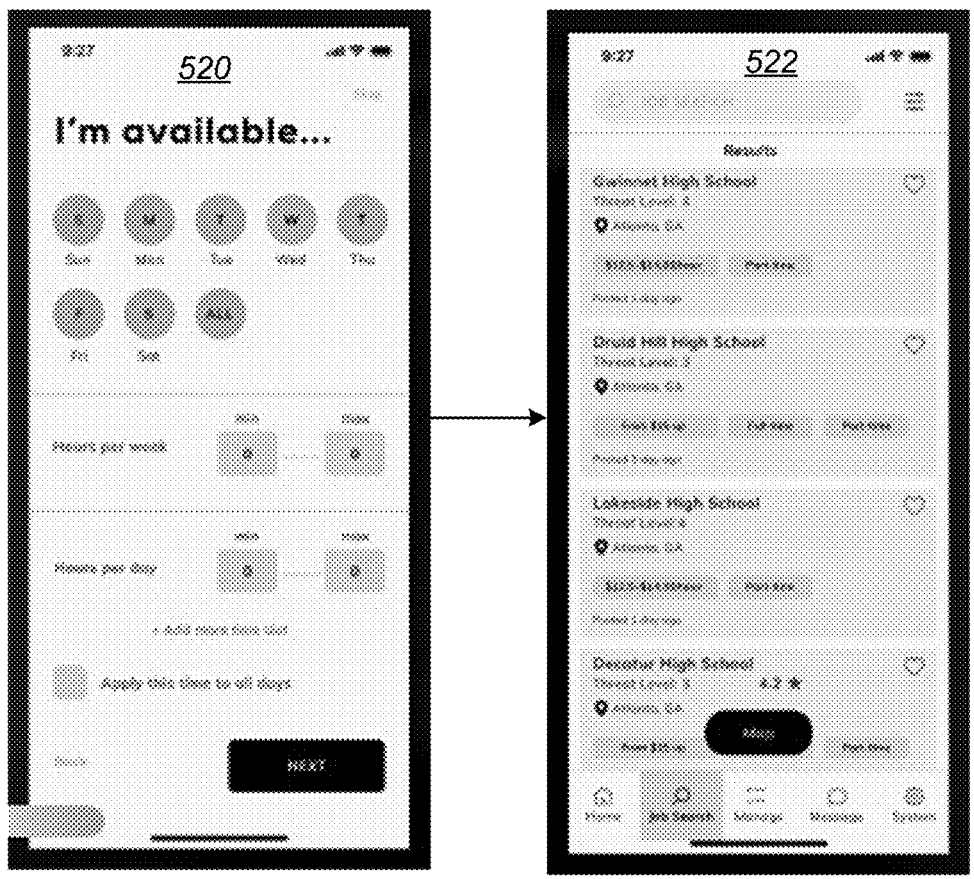
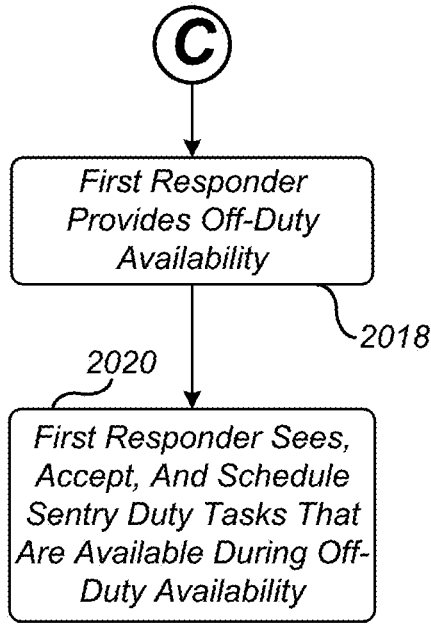
Fig. 17B

ASSIGNING SENTRY DUTY TASKS TO OFF-DUTY FIRST RESPONDERS

TECHNICAL FIELD OF THE INVENTION

This invention relates to a method of assigning sentry duty tasks to off-duty first responders. The method includes entering and storing persons of attendance into a watchful record. Then, in operation, scanning and processing the social media of the persons of attendance looking for future event warning signs. Responsive to the future event warning signs and associated threat level sentry duty tasks are generated that first responders can accept and execute during their off-duty hours. Other exemplary embodiments include venue administrators creating a future event warning sign that generates a sentry duty task based on a known need, things they are aware of or observe, or for other reasons.

BACKGROUND OF THE INVENTION

Before our invention, many crimes and other violent activities, particularly in neighborhoods and schools were talked about or foreshadowed by their perpetrators beforehand on social media. As such, a shortcoming is that in many cases there were warning signs that were missed to only be discovered after the fact.

Another shortcoming is that first responders such as law enforcement and others don't have an easy way to know about community needs in neighborhoods, schools, and other places thus are unable to allocate a portion of their off-duty time to meet community needs to earn extra money.

Together, a shortcoming is that before the present invention, there was no way to monitor social media associated with a group of people, detect through their social media presence preemptive warning signs that a crime or other undesirable event might happen, and schedule an off-duty first responder to engage in a sentry role to make sure such undesirable crimes or undesirable events don't become manifest.

The present invention addresses these and other shortcomings by providing a method of assigning sentry duty tasks to off-duty first responders and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a method of assigning sentry duty tasks to off-duty first responders. The method comprises the steps of entering and storing, by way of a venue administrator or another authorized person, at least one person of attendance into the watchful record. The watchful record comprises at least one person of attendance.

In operation, the method continues by retrieving, by the server, a plurality of social media content from one or more social media platforms. The plurality of social media content is associated with one more person of attendance in the watchful record. A future event warning sign record comprises at least one future event warning sign and associated therewith at least one first responder resource need, and at least one threat level.

The method continues by determining, by the server, if portions of the plurality of social media content match correspond to one or more of the future event warning signs stored in the future event warning sign record, and if affirmative the method continues by generating, by the server, for view and response by one or more first responder, a sentry duty task. The sentry duty task comprises one or more of the following: a date, a time, a duration, a watch area, the future event warning sign, the first responder need, the threat level, or a pay amount.

The method continues by, scheduling, by the server, a first responder identification of the first responder accepting the sentry duty task if a first responder type, of the first responder, responding matches the first responder need of the sentry duty task. A first responder record comprises the first responder identification, the first responder type, and a payment account.

Upon executing the sentry duty task, the method continues by paying electronically the payment account of the first responder the pay amount when the first responder attends and performs the sentry duty task.

Additional shortcomings of the prior art are overcome and additional advantages are provided through the provision of a method of assigning sentry duty tasks to off-duty first responders. In operation, the method comprises the steps of generating a future event warning sign, by way of a venue administrator or another authorized person using a computing device that data communicates with the server. The future event warning sign comprises one or more of the following: a date, a time, a duration, a watch area, or the future event warning sign. A future event warning sign record comprises at least one of the future event warning signs and associated therewith at least one first responder resource need, and at least one threat level.

The method continues by retrieving the first responder resource need, and the threat level from the future event warning sign record associated with the generated future event warning sign. And, generating, by the server, for view and response by one or more first responders, a sentry duty task. The sentry duty task comprises one or more of the following: the date, the watch area, the duration, the future event warning sign, the first responder need, the threat level, or a pay amount.

The method continues by scheduling, by the server, a first responder identification, of the first responder accepting the sentry duty task, if a first responder type of the first responder responding matches the first responder need of the sentry duty task. A first responder record comprises the first responder identification, the first responder type, and a payment account.

Upon executing the sentry duty task, the method continues by paying electronically the payment account of the first responder the pay amount when the first responder attends and performs the sentry duty task.

Additional shortcomings of the prior art are overcome and additional advantages are provided through the provision of a method of assigning sentry duty tasks to off-duty first responders. In operation, the method comprises the steps of reporting a future event warning sign, by way of a venue administrator or another authorized person using a computing device that data communicates with the server. The future event warning sign comprises one or more of the following: a date, a time, a duration, a watch area, or the future event warning sign. A future event warning sign record comprises at least one of the future event warning signs, and associated therewith at least one first responder resource need, and at least one of a threat level.

The method continues by, retrieving the first responder resource need, and the threat level, by the server, from the future event warning sign record associated with the future event warning sign, establishing, by way of the server, a geofenced area around the watch area, determining the pay amount based in part on size of the geofenced area, type of the future event warning sign, and the threat level, and setting the duration as a number of pass-through patrols expected to be executed by the first responder during the duration.

The method continues by generating, by the server, for view and response by one or more first responders, a sentry duty task that comprises one or more of the following: the date, the watch area, the duration, the future event warning sign, the first responder need, the threat level, or a pay amount. And, scheduling, by the server, a first responder identification, of the first responder accepting the sentry duty task, if a first responder type, of the first responder, responding matches the first responder need of the sentry duty task. A first responder record comprises the first responder identification, the first responder type, and a payment account.

Upon executing the sentry duty task the method continues by paying electronically the pay account of the first responder, by the server, as a prorated amount of the pay amount based on the number of pass-through patrols executed by the first responder during the duration period versus the number of pass-through patrols expected to be executed by the first responder during the duration.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 illustrates one example of a first responder drone pilot using a drone to monitor a watch area;

FIG. 7 illustrates examples of first responders, threat levels, and future event warning signs;

FIG. 8 illustrates one example of a system and network for assigning sentry duty tasks to off-duty first responders;

FIGS. 16A-16B and 17A-17B illustrate examples of screenshots of a software application.

Figure 1:
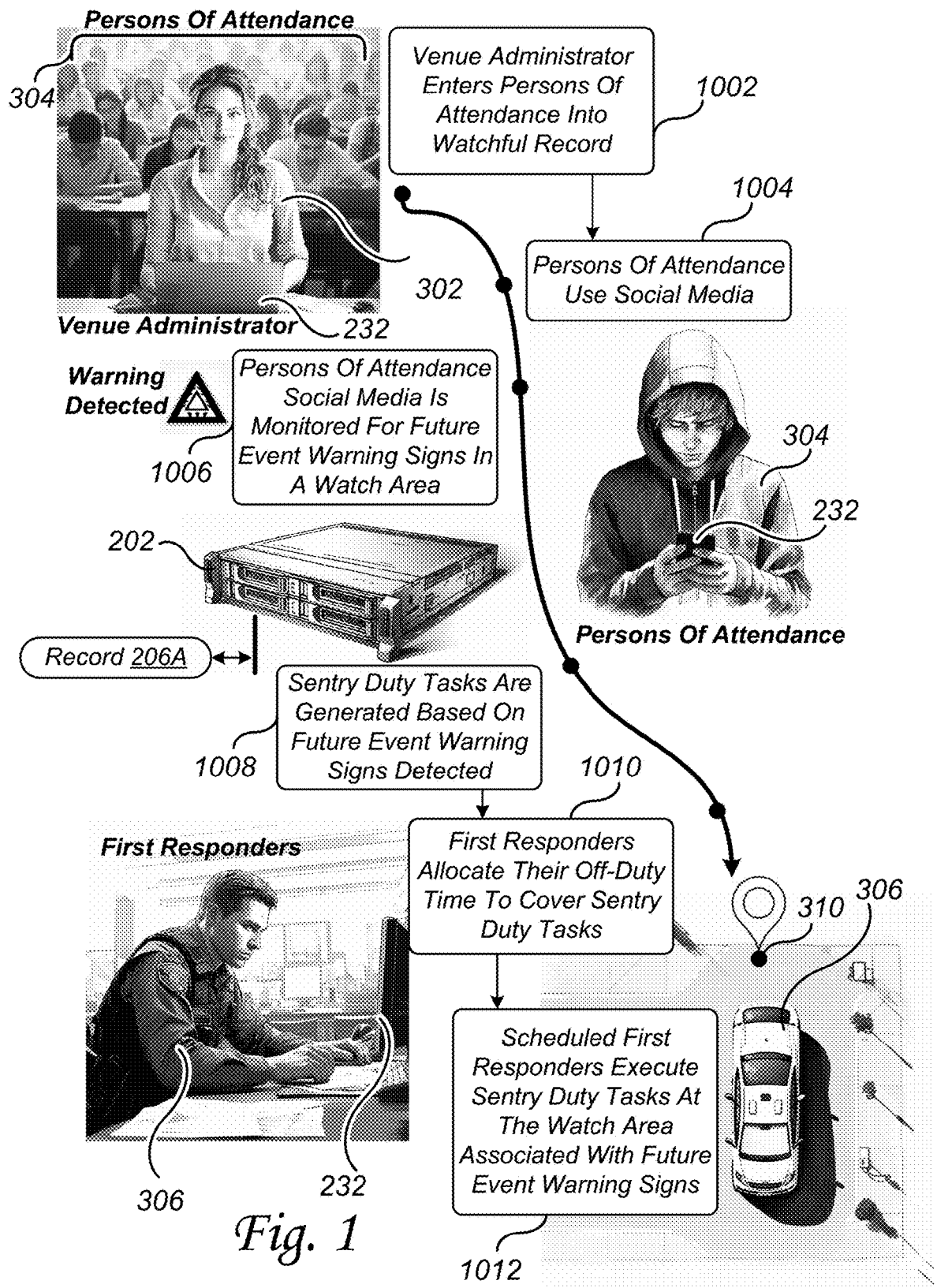
FIGS. 1-5 illustrate examples of a method of assigning sentry duty tasks to off-duty first responders.

The detailed description explains the preferred embodiments of the invention, together with advantages and features, by way of example with reference to the drawings.

DETAILED DESCRIPTION OF THE INVENTION

An advantage, in the present invention, is that community safety needs can matched with off-duty first responder resources. In this regard, when venue administrators 302, such as school teachers, school administrators, counselors, community watch persons, and other types and/or kinds of venue administrators need safety or security in a watch area 310 they can create, using a computing device 232, a future event warning sign. Such a future event warning sign can be a concern that something might happen in watch area 310 at a future time. Such concerns in watch area 310 might be potential criminal activity or potential violence. Other concerns in a watch might be patrols needed to monitor for suspicious activity, watch for bad actors in large crowds, or protect vulnerable children. Other concerns in a watch area may be medical related such as the presence of medical emergency response personnel at events, or a need for firefighter presence during firework or other fire-type celebrations. In general, and without limitation, concerns in a watch area can be wide-ranging and involve a variety of different kinds of off-duty first responders 206 in a variety of different disciplines, such as law enforcement, emergency medical technicians (ETM), firefighters, drone operators with drones, and numerous other types and/or kinds of first responders and trained professionals.

An advantage, in the present invention, is that when a venue administrator 302 creates a future event warning sign using a computing device 232, the systems, network, and methods of the present invention process the future event warning sign, determine the correct response, and when appropriate generate a sentry duty task. Off-duty first responders can then use computing devices 723 to allocate their off-duty time and accept the sentry duty tasks. When the first response performs that sentry duty task at the watch area during the date and time and for the duration of the future event warning sign payment for their service is made electronically to the first responder's payment account.

The present invention allows venue administrators 302 and other authorized persons to raise concerns of future event warning signs which are matched with off-duty first responders who perform sentry duty tasks to meet the concerns. In this regard, safety and security are increased in watch area 310 at critical times, and first responders can earn money doing what they do best in their off-duty time.

While in a plurality of exemplary embodiments, venue administrators 302 and authorized persons create the future event warning signs based on their needs, knowledge, and situational awareness, in a plurality of other exemplary embodiments, the future event warning signs are deduced from social media content. In this regard, an advantage, in the present invention, is for the venue administrator 302 and other authorized persons to add names of persons of attendance to a database.

For disclosure purposes, persons of attendance are those who might be part of a group, club, employee, student body at a school, future event attendees, people of concern, prior offenders, other individuals, and other types and/or kinds of people. The network, systems, and methods of the present invention then, in a continual manner, search and analyze social media content for future event warning signs such as illustrated in at least FIG. 7, future event warning signs 626. The future event warning signs can trigger the automatic creation of a sentry duty task with the relevant details, determined threat level, and specific first responder 306 need that can be the catalyst for matching the future event warning sign need or concern with the appropriate off-duty first responders 306.

For disclosure purposes, social media content can include without limitation, emails, texts, posts, websites, videos, pictures, recordings, writings, digital content, and other types and/or kinds of social media. Such social media content can originate on, for example, and not a limitation, YOUTUBE, TIKTOK, FACEBOOK, INSTAGRAM, or other online social media websites, blogs, forums, and/or other social media platforms.

For disclosure purposes, a venue administrator 302 can be a person who is associated with a venue or has an interest in one or more of the venue members. Such a venue administrator 302 can be a teacher, counselor, school administrator, neighborhood watch person, venue member's parent or guardian, or other type and/or kind of venue administrator, as may be required and/or desired in a particular embodiment.

Additionally, venue administrators 302 can also include other authorized persons who may have authorized access to the systems, network, and methods of the present invention. For disclosure purposes, venue administrators 302 and other authorized persons can be referred to as venue administrators 302.

For disclosure purposes, a venue associated with the venue administrator 302 can be a school, neighborhood, business, restaurant, public space, or other types and/or kinds of venues, without limitation, as may be required and/or desired in a particular embodiment.

For disclosure purposes, the venue can be referred to as a watch area 310. The watch area 310 can be associated with the venue administrator 302, an area or space proximate to the venue, an event space where members of the venue attend or meet, public spaces used by members of the venue, homes, businesses, restaurants, or other places of members of the venue, places known by the venue administrator, places deduced from analyzing social media content of members of the venue, or other types and/or kinds of places, without limitation, as may be required and/or desired in a particular embodiment.

For disclosure purposes, a venue member can be referred to as a person of attendance 304 or a group of venue members can be referred to as persons of attendance 304. In this regard, as an example, and not a limitation, each student of a class, school, event, group, or other affiliation can be referred to as a person of attendance. Other examples can include people loitering, gang members present, those people planning or committing illegal, criminal, bullying, or hateful crimes, and other people, as may be required and/or desired in a particular embodiment.

Turning now to the drawings in greater detail, it will be seen that in FIG. 1 there is illustrated one example of a method of assigning sentry duty tasks to off-duty first responders 306. In an exemplary embodiment, and one example use case of the present invention, in step 1002, a venue administrator 302 can enter one or more persons of attendance 304 into a watchful record 614. The watchful record 614 can be part of a database that is stored on a remote data processing resource 202, such as in database 206A, or another suitable database or location, as may be required and/or desired in a particular embodiment.

In step 1004, the persons of attendance 304 can use computing devices 232, as usual, to interact with social media resources, generating social media content in the form of posts, writings, images, videos, and other types and kinds of social media content.

In step 1006, the present invention retrieves, from the watchful record 614, information about each of the persons of attendance to monitor and uses the information to query, follow, web crawl, scan, review, and analyze text, images, videos, and other social media content for items that could be considered a future event warning sign. In this regard, at least FIG. 7 illustrates examples of future event warning signs 626. Such future event warning signs can include, as an example and not a limitation, the following:

1) Text with certain violent or disturbing threats/key bully intimidating phrases or words;
2) Pictures of blood, gore, weapons, gang activity, or nudity;
3) Videos or captions of violent or disturbing messages or images;
4) Parade routes, building plans, site logistics, public event threats with school, kids, or teachers planning on attending;
5) Unauthorized motion of firearms, weapons, chemicals, medicines, or other items that are air-tag and/or otherwise remotely trackable, wherein such motion may indicate a person of attendance has access or is in possession; and
6) Other types or kinds of future event warning signs, as may be required and/or desired in a particular embodiment.

In step 1008, when a future event warning sign is detected a decision is made by the present invention based in part on the future event warning type, threat level, if a first responder is needed, and if so what type of first responder. In this regard, at least FIG. 7 illustrates examples of threat level 624. Such threat level 624 can include, as an example and not a limitation, the following:

Level 1—Drugs/Non-lethal weapons;
Level 2—Fighting/crowd controls;
Level 3—Rumors/Violent online posts or verbal threats of violence;
Level 4—Lethal weapon on campus/Verified by the school; and
Level 5—Weapon in the hand of a bad actor attempting to harm NOW.
Level+—Others In addition, at least FIG. 7 illustrates examples of first responders 622. Such first responders 622 can include, as an example and not a limitation, the following: law enforcement, medical emergency medical technician (EMT), firefighter, drone pilot, and others, as may be required and/or desired in a particular embodiment.

Figure 9:
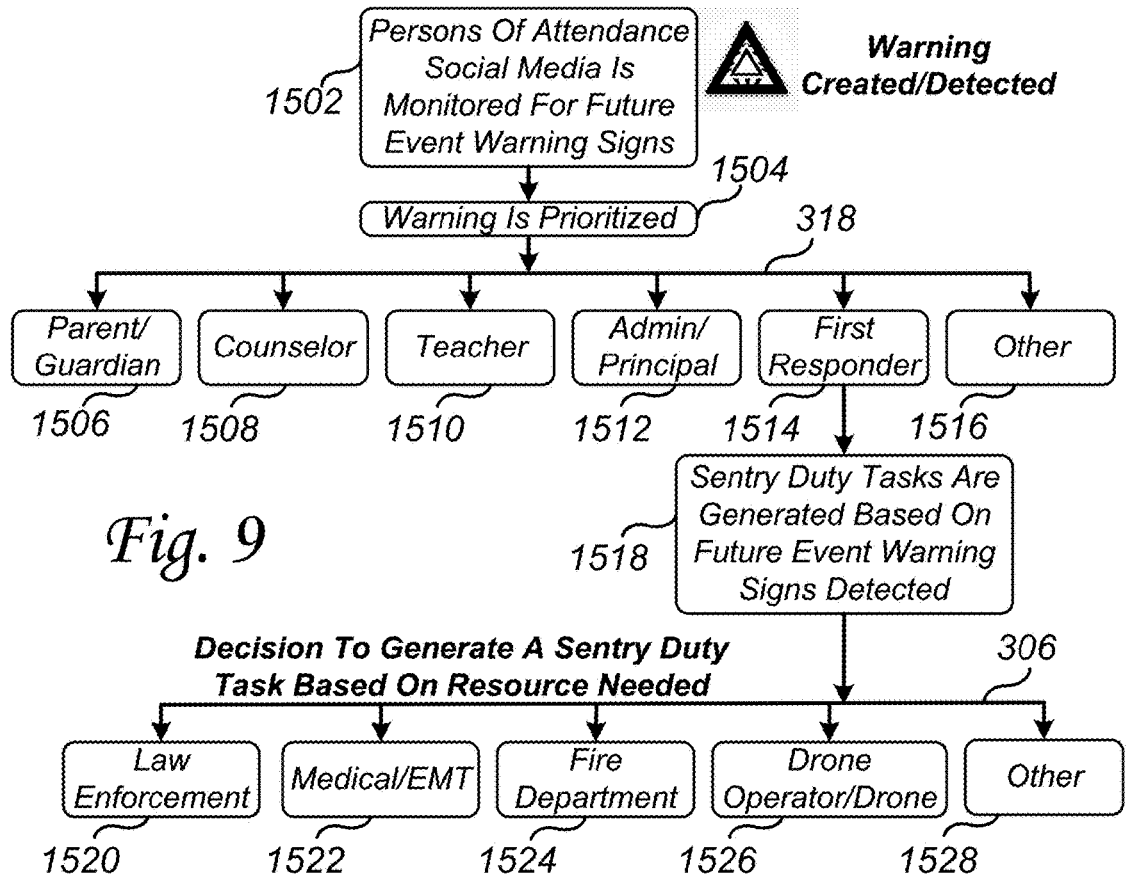
FIG. 9 illustrates one example of decision flow when a future event warning sign is detected in social media content.

With reference to at least FIG. 9, if a situation doesn't arise to the level of needing a first responder 622 then the present invention will use electronic communication notifications, such as email, SMS text, and other electronic communication notifications, to delegate the needed response to the future event warning sign to the appropriate stakeholder. Such stakeholders can include parents, guardians, school teachers, school counselors, school administrators, and others, as may be required and or desired in a particular embodiment, the determination.

In step 1010, a first responder 306 can allocate a portion of their off-duty time to cover the sentry duty needs. The first responder 306, can then review posted sentry duty needs of watch areas that have associated therewith a future event warning sign, that occurs during their off-duty hours and accept the sentry duty tasks. With reference to at least FIG. 10, sentry duty task 1604.

In step 1012, the first responder 306 executes the sentry duty task and the watch area associated with the future event warning sign.

Figure 2:
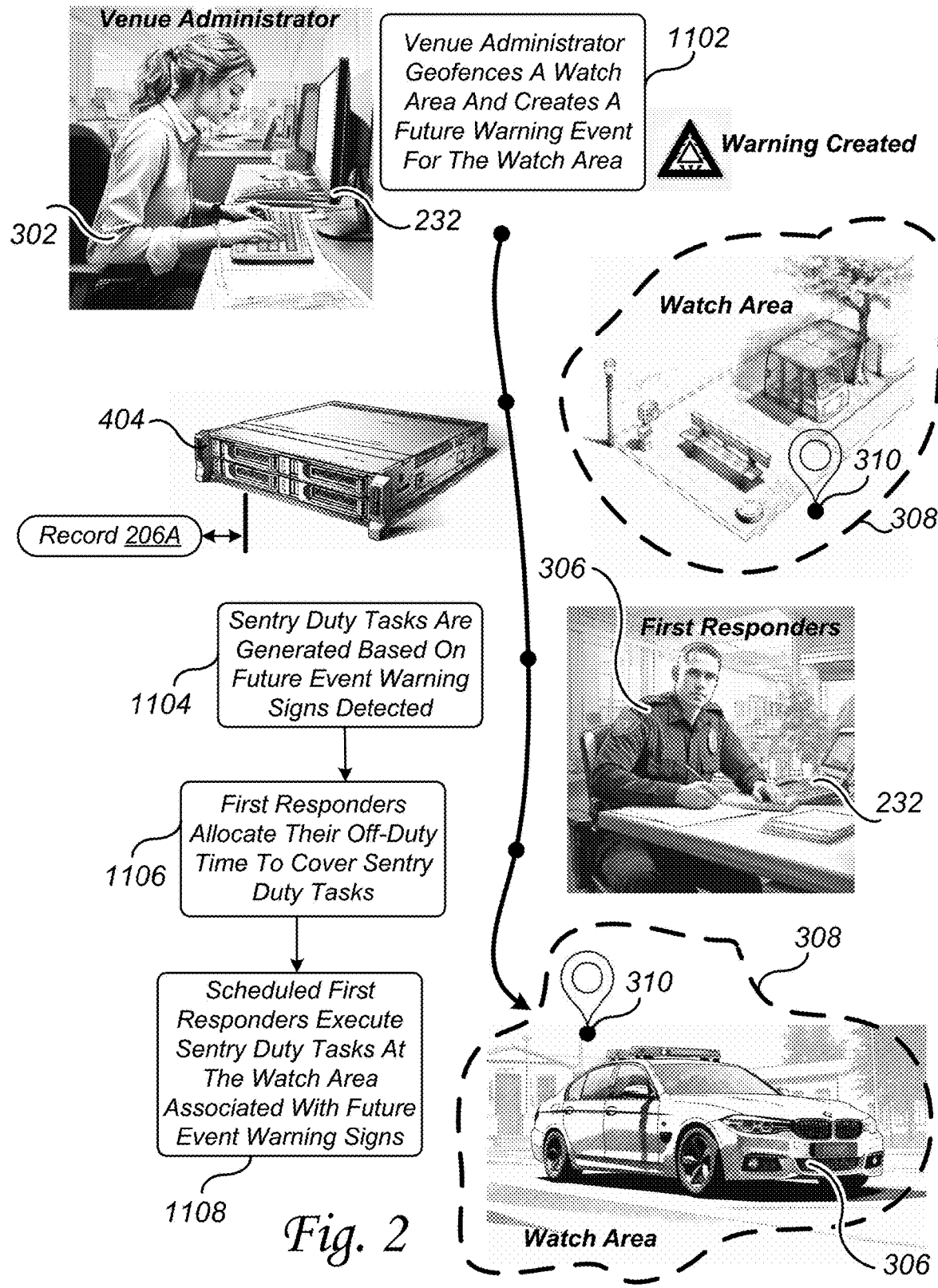

Referring to FIG. 2, there is illustrated one example of a method of assigning sentry duty tasks to off-duty first responders 306. In an exemplary embodiment, starting in step 1102, a venue administrator 302 can geofence 308 a watch area and create a future warning event for the watch area 310. Such future event warning signs for a geofenced 308 watch area 310 can be a need for security at a school event, around a bus stop area, or other watch areas. In this regard, the venue administrator 302 with planning or knowledge of the watch area and event can plan for first responder sentry duty task help, as appropriate and as required and/or desired in a particular embodiment.

In step 1104, responsive to the created future warning event, a decision by the present invention can be made based in part on the future event warning type, threat level, if a first responder is needed, and if so what type of first responder. In this regard, at least FIG. 7 illustrates examples of threat level 624.

In step 1106, a first responder 306 can allocate a portion of their off-duty time to cover the sentry duty needs. The first responder 306, can then review posted sentry duty needs of watch areas that have associated therewith a future event warning sign, that occurs during their off-duty hours and accept the sentry duty tasks. With reference to at least FIG. 10, sentry duty task 1604.

In an exemplary embodiment, while some sentry duty tasks can be single occurrences, as needed, or other short or immediate needs, others can be recurring. In this regard, some sentry duty tasks can occur at periodic intervals. such recurring sentry duty tasks can include, as an example, a presence at a church each Sunday, a daily presence for a short time period at a school, and other recurring needs and tasks.

In step 1108, the first responder 306 executes the sentry duty task and the watch area associated with the future event warning sign.

Figure 3:
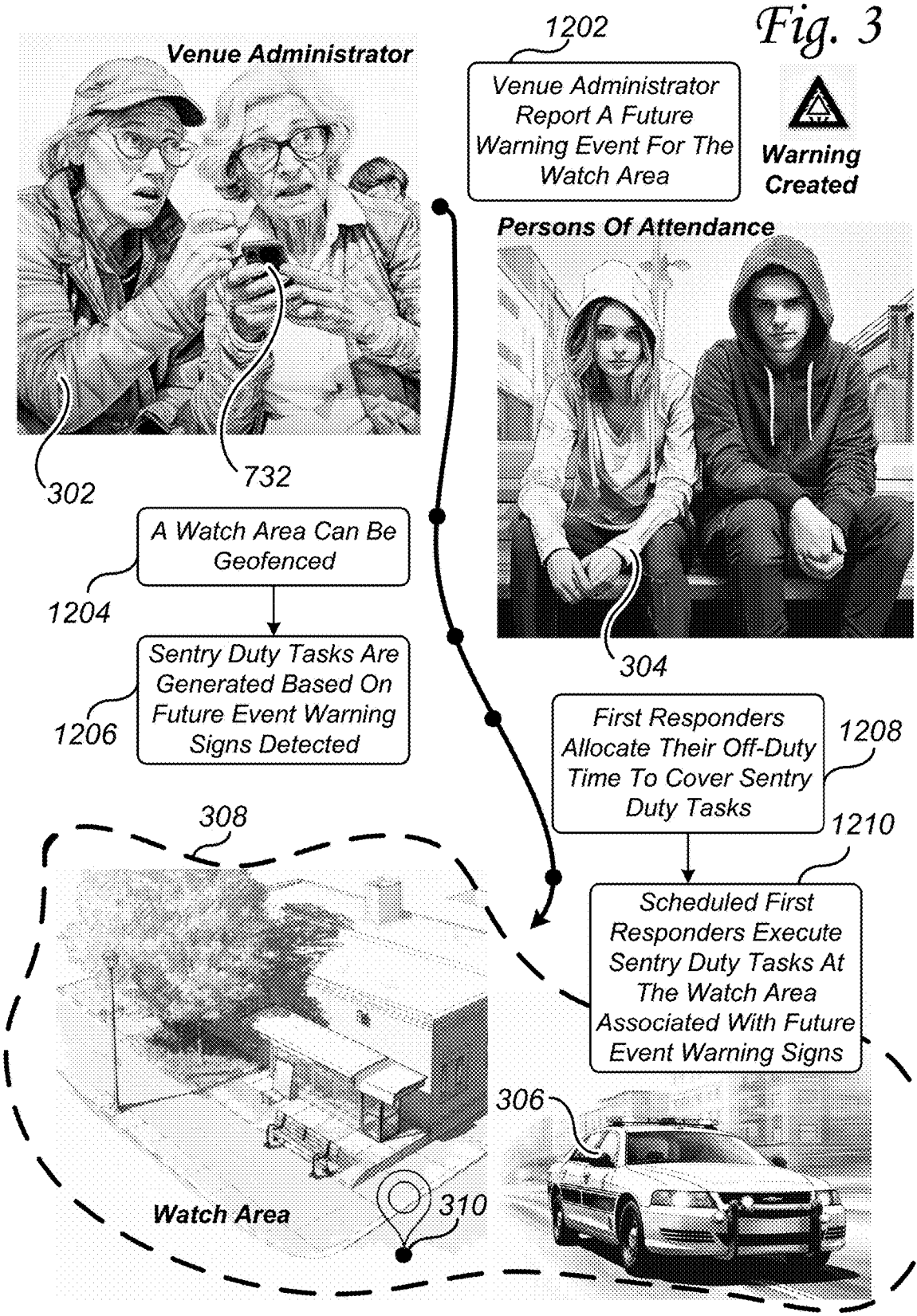

Referring to FIG. 3, there is illustrated one example of a method of assigning sentry duty tasks to off-duty first responders 306. In an exemplary embodiment, in FIG. 1 the future event warning signs were insights generated by analysis of social media and other digital content, and in FIG. 2 the future event warning signs were created by venue administrators 304 around planned events, FIG. 3 allows community members to report future warning signs. In this regard, in step 1202, venue administrators 302 can be community members and others at large who are authorized to report future event warning signs as they hear about or witness. Such reports, using a computing device 732, can be teens, gangs, groups, suspicious activity, bullying, and other activities, wherein the future event warning signs suggest an escalation, persistence, reoccurrence, or other types of enhanced encounter, danger, or other.

In step 1204, based on the reported future event warning sign, a watch area 310 can be identified and a geofence 308 created around the watch area. Such future event warning signs for a geofenced 308 watch area 310 based on a community-reported need can be a physical presence of just occasional patrols through the geofenced 308 area, such as patrols during certain time periods through a neighborhood, a park, a school, a bus stop area, a restaurant or bar, or other watch areas.

In step 1204, responsive to the created future warning event, a decision by the present invention can be made based in part on the future event warning type, threat level, if a first responder is needed, and if so what type of first responder. In this regard, at least FIG. 7 illustrates examples of threat level 624.

In step 1208, a first responder 306 can allocate a portion of their off-duty time to cover the sentry duty needs. The first responder 306, can then review posted sentry duty needs of watch areas that have associated therewith a future event warning sign, that occurs during their off-duty hours and accept the sentry duty tasks. With reference to at least FIG. 10, sentry duty task 1604.

In an exemplary embodiment, while some sentry duty tasks can be single occurrences, as needed, or other short or immediate needs, others can be recurring. In this regard, some sentry duty tasks can occur at periodic intervals. Such recurring sentry duty tasks can include, for example, patrols through a watch area, a presence at a church each Sunday, a daily presence for a short time at a school, and other recurring needs and tasks.

In step 1210, the first responder 306 executes the sentry duty task and the watch area associated with the future event warning sign.

Figure 4:
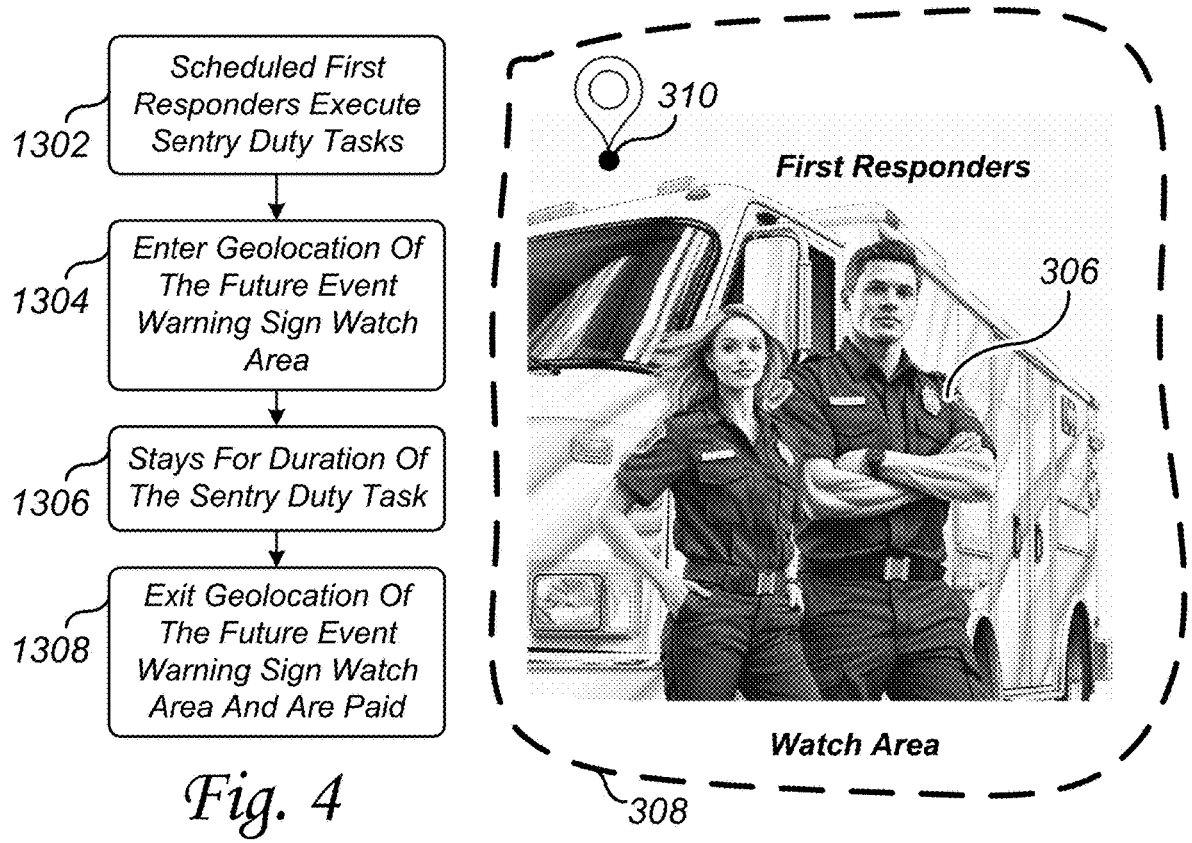

Referring to FIG. 4, there is illustrated one example of a method of assigning sentry duty tasks to off-duty first responders 306. In an exemplary embodiment, a sentry duty task may require the physical presence of the first responder within a geofence 308 that is around the watch area 310 for the duration of the assignment. In this regard, in step 1302, the first responder can accept and be scheduled to execute a sentry duty task for attendance within a geofence 308 around a watch area 310.

In step 1304, such tracking of the first responder 306 can be done by way of geolocation of the first responder, the first responder's smartphone 232, or other computing devices 232, or by other suitable ways during the sentry duty task. In this regard, the date, time, and other information can be collected each time the first responder 306 enters and/or exits the geofence 308 during the sentry duty task duration. In effect, tracking or otherwise accounting to be able to determine if the first responder 306 satisfactorily completed the requirements of the sentry duty task.

In step 1306, in accordance with the requirements of the sentry duty task, when the sentry duty task is an onsite task, the first responder 306 is required to stay within the geofence 308 proximate the watch area 310.

In step 1308, at the end of the duration of the sentry duty task, if the requirements of the sentry duty task were completed by the first responder 306, such as staying within the geofence 308 proximate to the watch area 310, or other types and/or kinds of requirements, the first responder's 306 is paid by crediting the first responder's pay account for the completed sentry duty task work.

Figure 5:
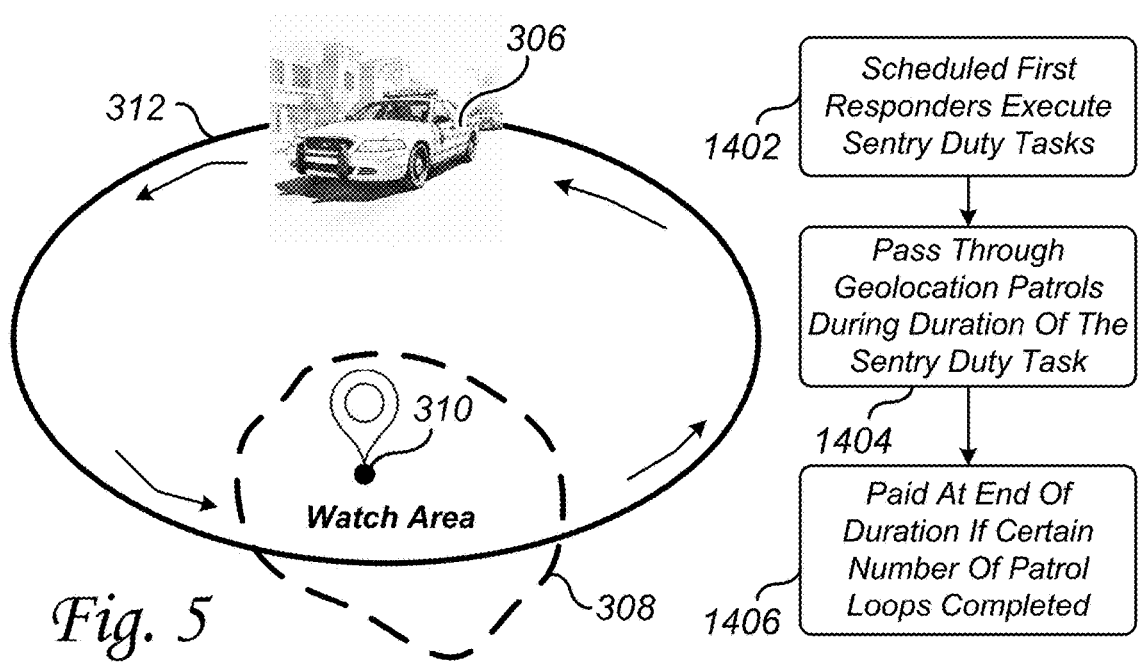

Referring to FIG. 5, there is illustrated one example of a method of assigning sentry duty tasks to off-duty first responders 306. In an exemplary embodiment, often a sentry duty task may not require the physical presence of the first responder for the duration of the assignment, rather only a patrol 312 through a geofenced 308 area that defines a watch area 310. In this regard, in step 1402, the first responder can accept and be scheduled to execute a sentry duty task for patrol through a geofence 308 around a watch area 310.

In step 1404, the sentry duty task may require the first responder 306 to drive, walk, or otherwise, patrol 312 passing through the geofence 308 area a certain number of times during the duration of the sentry duty task, as an example and not a limitation, every 30 minutes, 5 times during the duration, or other desired interval, as may be required and/or desired in a particular embodiment.

In an exemplary embodiment, such tracking of the first responder 306 patrol frequency through the geofence 308 can be done by way of geolocation of the first responder, the first responder's smartphone 232, or other computing devices 232, or by other suitable ways during the sentry duty task. In this regard, the date, time, and other information can be collected each time the first responder 306 enters and/or exits the geofence 308 during the sentry duty task duration. In effect, tracking and counting patrols, or otherwise accounting to be able to determine if the first responder 306 satisfactorily completed the requirements of the sentry duty task.

In step 1406, at the end of the duration of the sentry duty task, if the requirements of the sentry duty task were completed by the first responder 306, such as a certain number of patrol loops through the geolocation 308, or other types and/or kinds of requirements, the first responder's 306 is paid by crediting the first responder's pay account for the completed sentry duty task work.

Referring to FIG. 6, there is illustrated one example of a first responder 306 who is a drone pilot using a drone 316 to monitor a watch area 310 within a geofence 308. In an exemplary embodiment, a first responder 306 can be a drone pilot. In addition, the sentry duty task can be to operate a drone 310 over a watch area 310 within a geofence 308. Such a watch area 310 can be a festival, concert, sports event, or other type and/or kind of watch area 310 that can be monitored from the air with a drone 310. Such drones can use cameras, microphones, loudspeakers, surveillance equipment, and/or other features as may be required and or desired in a particular embodiment.

In operation, first responder 306 drone operator can use remote drone control 314 to operate the drone over the watch area within the geofence 308 during the duration of the sentry duty task.

In an exemplary embodiment, such tracking of the first responder 306 drone patrol through the geofence 308 can be done by way of geolocation of the drone or first responder, the first responder's smartphone 232, or other computing devices 232, or by other suitable ways during the sentry duty task.

At the end of the duration of the sentry duty task, if the requirements of the sentry duty task were completed by the first responder 206, such as staying within the geofence 308 proximate to the watch area 310, or other types and/or kinds of requirements, the first responder's 306 is paid by crediting the first responder's pay account for the completed sentry duty task work.

Referring to FIG. 8, there is illustrated one example of a system and network for assigning sentry duty tasks to off-duty first responders 306. In an exemplary embodiment, users of the platform and network can include venue administrators 302, First responders 306, or other authorized persons.

Each of the users uses computing devices 232A-C to data communicate over a global communication network 200 with one or more data processing resources 202. The computing devices 232A-C can be laptop computers, desktop computers, smartphones, tablets, or other types and kinds of computing devices, as may be required and/or desired in a particular embodiment. For disclosure purposes, computing devices 232A-C can be referred to as computing devices 232. Additionally, laptop and desktop types of computing devices 232 can be referred to as computing devices 212C, computing devices 232 such as smartphones can be referred to as computing devices 232B, and computing devices 232 such as tablets can be referred to as computing devices 232A. In operation, any of the users can use any of the types of computing devices 232A-C, without limitation to the type or kind of computing device 232, as may be required and/or desired in a particular embodiment. The global communication network 200 can be the Internet.

The computing devices 232 can comprise a microprocessor 204B/204C, a database 206B/206C, memory 208C, a communication interface 210B/210C, a display 212B/212C, and a plurality of general-purpose inputs and outputs (GPIO) 214B/214C.

Additionally, mobile type of computing device 232A/232B (tablets, smartphones, and others) can comprise a global positioning system (GPS) 216, and a microphone and/or camera 218.

In general, computing devices 232 can be configured with other functions and features, as may be required and/or desired in a particular embodiment.

In an exemplary embodiment, the microprocessor 704B is operationally related to database 206B, memory 208B, communication interface 210B, display 212B, and GPIO 214B.

In an exemplary embodiment, the microprocessor 204C is operationally related to database 206C, memory 208C, communication interface 210C, display 212C, GPIO 214C, and if equipped with GPS 216, and microphone and/or camera 218. The computing devices 232 each rely on a suitable power source 220B/220C which can include a rechargeable battery, external power supply, or other types and/or kinds of power sources.

Microprocessor 204B/204C can be INTEL, ZILOG, MICROCHIP, AMD, ARM, and/or other types or kinds of microprocessors.

Database 206B/206C can be SQL, MYSQL, MARIADB, ORACLE, MS ACCESS, network-accessible storage, flat files, a combination thereof, or other types and kinds of databases.

Memory 208B/208C can be a combination of RAM, ROM, flash, hard drives, solid-state drives, USB flash drives, micro-SD cards, or other types of removable memory, and/or other types and kinds of memory.

The communication interfaces 210B/210C can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display 212B/212C can be a liquid crystal display (LCD), light emitting diode (LED), organic light emitting diode (OLED), or other types and kinds of displays.

The general-purpose inputs and outputs (GPIO) 214B/214C can be TTL, CMOS, MOSFET, transistors, buffers, relays, pushbuttons, switches, and/or other types and kinds of GPIO circuits. In an exemplary embodiment, some of the GPIO 214 lines can be used to drive a touch screen input, biometric input devices, keyboards, and/or types and kinds of computing device input devices.

Global positioning system (GPS) device 216 can be used to determine the geographic location of first responders 306 and others who are carrying a computing device 232 equipped with a GPS 216. In this regard, such computing devices 232 are typically mobile computing devices such as tablets 232A, smartphones 232B, and other similar types and/or kinds of mobile computing devices 232.

Microphone and/or camera 218 can be used to record audio, and video, and take pictures. In this regard, users 302/306 can use their computing devices equipped with a microphone and/or camera 218 to make digital media records that can be selectively shared as appropriate including on social media and other digital media outlet locations.

With reference to FIG. 8, the data processing resource 202 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 202 can also be referred to as server 202.

The data processing resource 202 can comprise a microprocessor 204A, a database 206A, memory 208A, and a communication interface 210A. The microprocessor 204A is operationally related to database 206A, memory 208A, and communication interface 210A.

The microprocessor 204A can be INTEL, ZILOG, MICROCHIP, AMD, ARM, and/or other types or kinds of microprocessors.

The database 206A can be SQL, MYSQL, MARIADB, ORACLE, MS ACCESS, network accessible storage, flat files, a combination thereof, or other types and kinds of databases.

The memory 208A can be a combination of RAM, ROM, flash, hard drives, solid-state drives, USB flash drives, micro-SD cards, or other types of removable memory, and/or other types and kinds of memory.

The communication interfaces 210A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In operation, data communicating devices 232 can data communicate with remote data processing resources 202 and store and retrieve data from databases 206A-C, and other data processing resources, as may be required and/or desired in a particular embodiment. Laptops, smartphones, smartwatches, tablets, desktop computers, servers, mobile communication devices, and other types and kinds of data communication devices can all be data communicating devices 232 also referred to as computing devices 232.

Such data processing resources 202 can be a server 202 or other types and kinds of data processing resources. Furthermore, data communicating devices 232, remote data processing resources 202, data storage resources 206A-C, and other types and kinds of data communicating devices can data communicate over a global network 200. The Internet is a global network 200.

Referring to FIG. 9, there is illustrates one example of decision flow when a future event warning sign is detected in social media content. In an exemplary embodiment, in step 1502, when the social media of a person of attendance 304 is being monitored and a future event warning sign is detected or created by a venue administrator or another authorized person the warning is processed. In this regard, in step 1504 the warning is prioritized as to which type of resource should be engaged. Based on the future event warning sign, the threat level, and other factors the warning prioritization my be to notify by electronic communication a parent or guardian 1506, a counselor 1508, a teacher 1510, an administrator or school principal 1512, or other people and/or resources 1516.

In the case that the warning prioritization is for a first responder in step 1514 then in step 1518 the appropriate sentry duty task can be generated based on the future event warning sign, threat level, and other factors. Based on the needed first responder resource, the sentry duty task can be targeted towards law enforcement 1520, medical and/or emergency medical technicians (EMT), fire department and/or firefighters 1524, drone operators and/or drones 1526, or other first responder resources 1528, as may be required and or desired in a particular embodiment.

Figure 10:
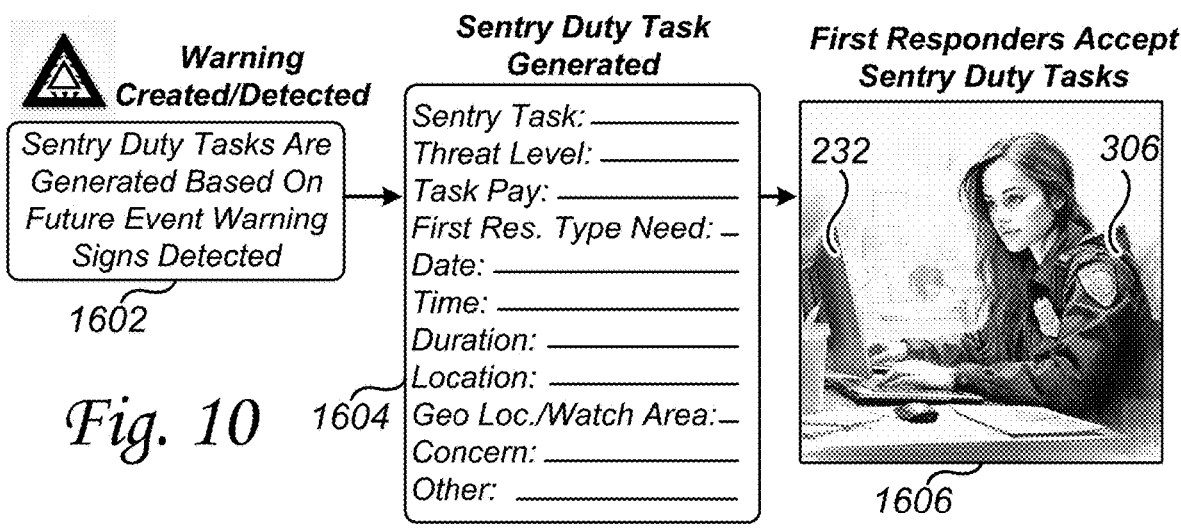
FIG. 10 illustrates one example of generating and assigning a sentry duty task.

Referring to FIG. 10, there is illustrated one example of generating and assigning a sentry duty task. In an exemplary embodiment, in step 1602, the sentry duty task 1604 is generated. Such generation can be created by a venue administrator or another authorized person created, or detected by way of social media monitoring. The sentry duty task 1604 can comprise one or more of the following: the sentry task, threat level, task pay, first responder type of resource needed, date needed, time needed, duration of the task, geolocation/watch area, and concerns, and other information, as may be required and/or desired in a particular embodiment. Once the sentry duty task 1604 is created, in step 1606, first responders 306 can use computing device 232 to search, find, accept, and be scheduled to execute the sentry duty task during their off-duty hours.

Figure 11:
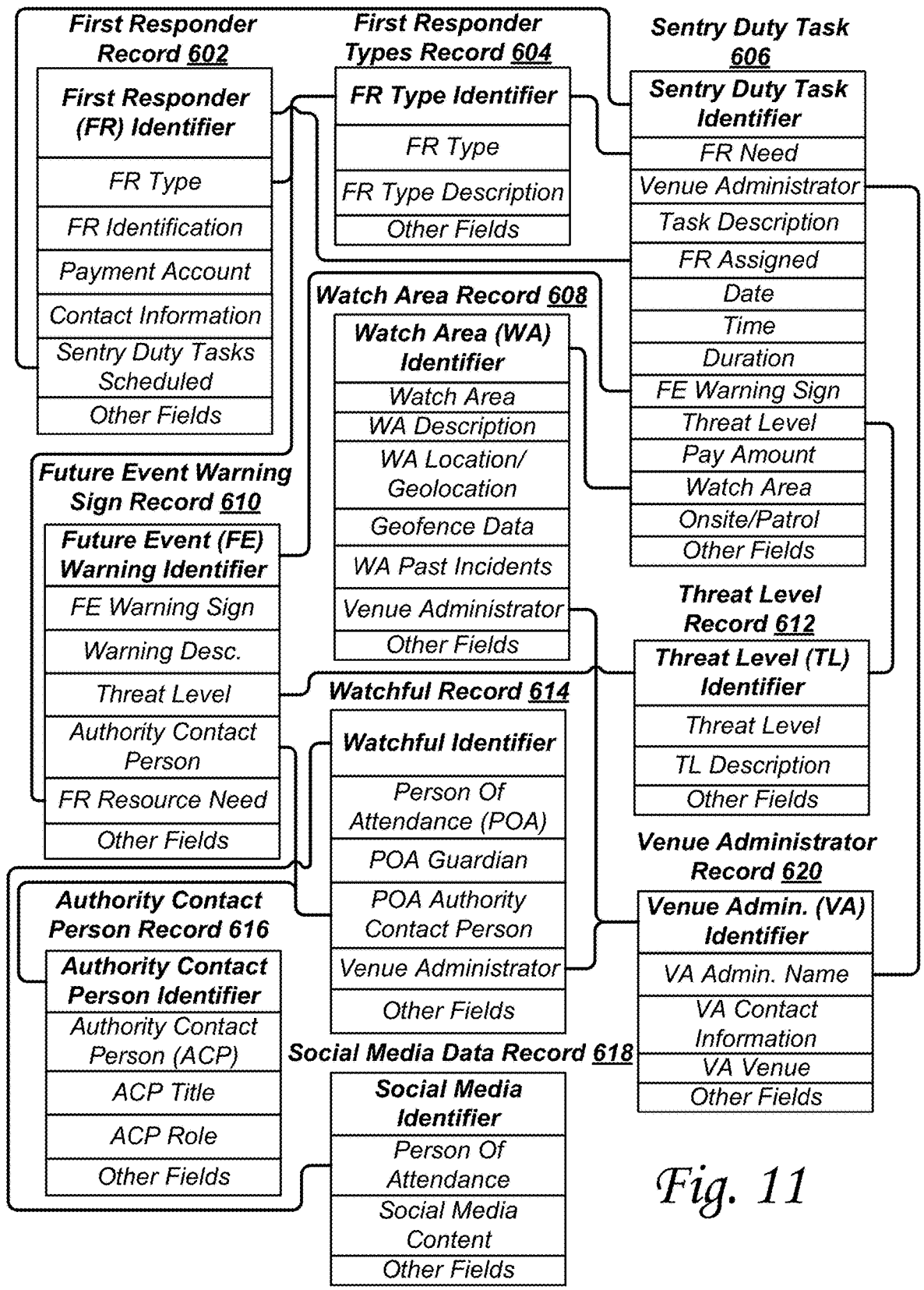
FIG. 11 illustrates one example of a database structure for a method of assigning sentry duty tasks to off-duty first responders.

FIG. 11 illustrates one example of a database structure for a method of assigning sentry duty tasks to off-duty first responders. In an exemplary embodiment, at least one database 206A/206B/206C can be implemented on at least one of the data processing resources 202 also referred to as server 202, or computing devices 232. In operation, one or more databases 206A/206B/206C can be accessed/created/managed/maintained as appropriate by more than one stakeholder. In this regard, in addition to system administrators and other authorized persons, other stakeholders can access/create/manage/maintain as appropriate.

In an exemplary embodiment, such databases 206A/206B/206C can be SQL, MYSQL, MARIADB, ORACLE, MS ACCESS, network-accessible storage, flat files, a combination thereof, or other types and kinds of databases.

In an exemplary embodiment, the database can reside on a remote data processing resource 202 in database 206A or another suitable location. In this regard, the database can comprise a series of tables, records, fields, and accounts that include first responder record 602, first responder types record 604, sentry duty task 606, watch area record 608, future event warning sign record 610, threat level record 612, watchful record 614, authority contact person record 616, social media data record 618, venue administrator record 620, and/or other types or kinds of records as may be required and/or desired in a particular embodiment. The database structure illustrated in FIG. 11 also illustrates the relationship between the various tables.

In an exemplary embodiment, the data structure in FIG. 11 is illustrative and can be expanded and modified without particular limitation as needed and as appropriate to support the functionality and methods of the present invention and to support future functionality and methods of the present invention as it grows and evolves over time.

Figure 12:
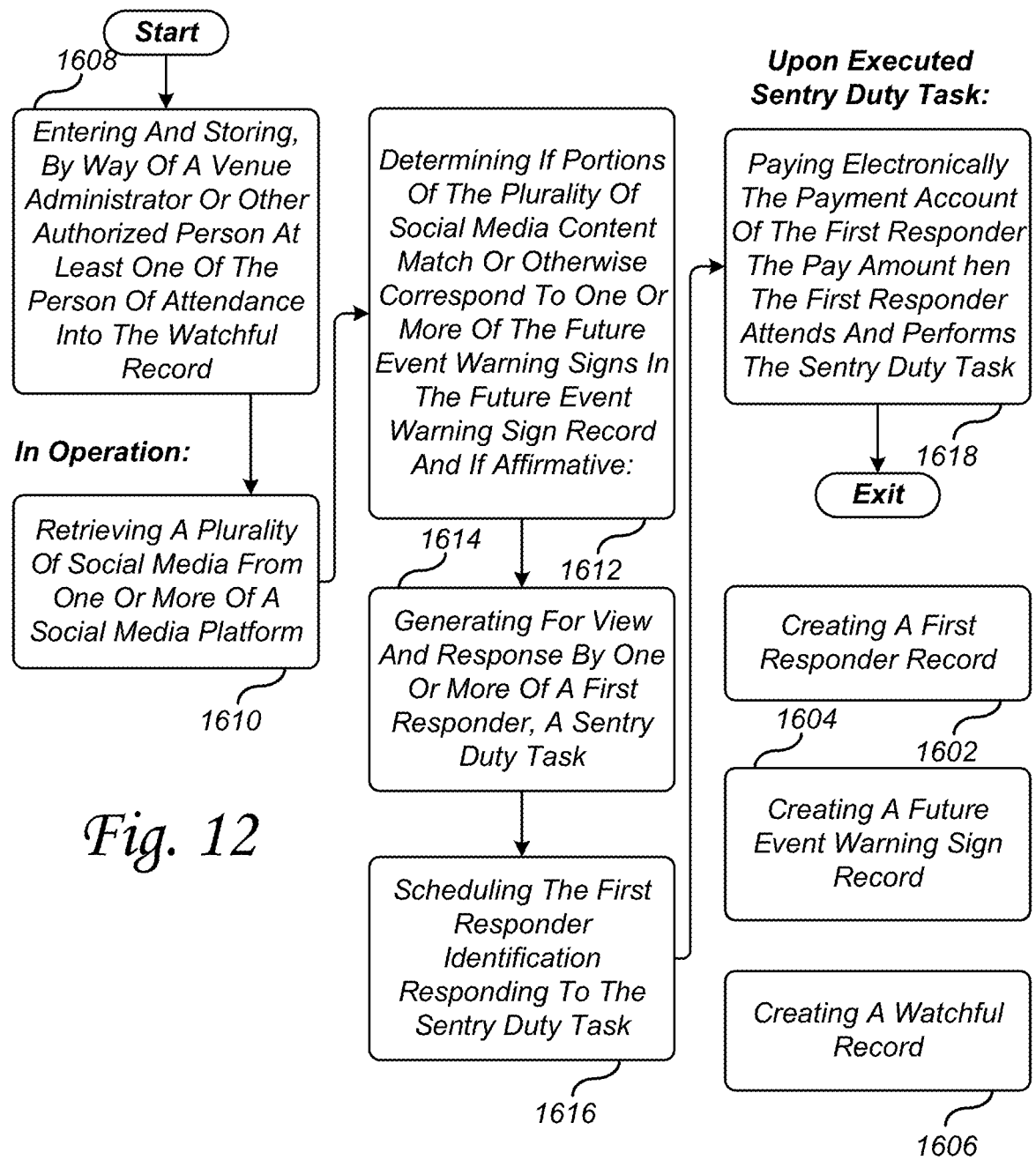
FIGS. 12-14 illustrates examples of a method of assigning sentry duty tasks to off-duty first responders.

Referring to FIG. 12, there is illustrated one example of a method of assigning sentry duty tasks to off-duty first responders. In an exemplary embodiment, in step 1602, a first responder record 602 can be created that comprises a first responder identification, a first responder type, and a payment account.

In step 1604, a future event warning sign record 604 can be created that comprises at least one of a future event warning sign and associated therewith at least one of a first responder resource need, and at least one of a threat level. The method then moves to step 1606.

In step 1606, a watchful record 614 can be created that comprises at least one person of attendance.

In an exemplary embodiment, the method then begins in step 1608. In this regard, a venue administrator 302, or another authorized person, can enter and store at least one person of attendance in the watchful record 614. The method then moves to step 1610.

In step 1610, in operation, a plurality of social media content is retrieved, by server 202, from one or more social media platforms. The plurality of social media content is associated with one more of the person of attendance in the watchful record 614. The method then moves to step 1612.

In step 1612, a determination is made, by the server, if portions of the plurality of social media content match or otherwise correspond to one or more of the future event warning sign stored in the future event warning sign record 610, and if in the affirmative the method moves to step 1614.

In step 1614, the method continues by generating, by server 202, for view and response by one or more first responders, a sentry duty task that comprises one or more of the following: a date, a time, a duration, a watch area, the future event warning sign, the first responder need, the threat level, or a pay amount. The method then moves to step 1616.

In step 1616, the method continues by scheduling, by the server, a first responder identification of the first responder accepting the sentry duty task if a first responder type, of the first responder, responding matches the first responder need of the sentry duty task. A first responder record comprises the first responder identification, the first responder type, and a payment account. The method then moves to step 1618.

In step 1618, upon executing the sentry duty task by the scheduled first responder 306, paying electronically the payment account of the first responder 306 the pay amount when the first responder attends and performs the sentry duty task.

Figure 13:
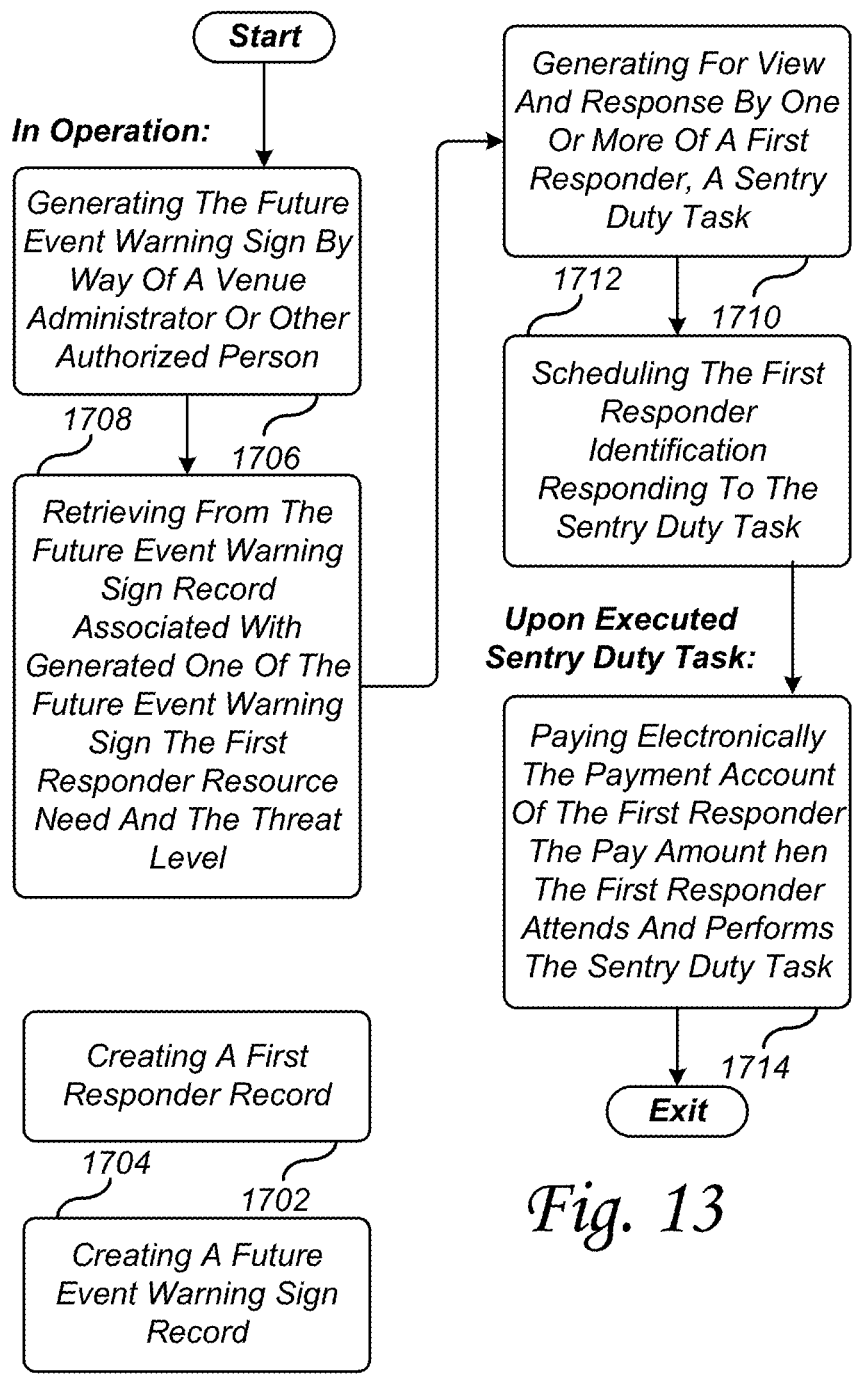

Referring to FIG. 13, there is illustrated one example of a method of assigning sentry duty tasks to off-duty first responders. In an exemplary embodiment, in step 1702, a first responder record 602 can be created that comprises a first responder identification, a first responder type, and a payment account.

In step 1704, a future event warning sign record comprises at least one of a future event warning sign and associated therewith at least one of a first responder resource need, and at least one of a threat level.

In an exemplary embodiment, in operation, the method begins in step 1706 by generating the future event warning sign, by way of a venue administrator or another authorized person using a computing device that data communicates with the server, the future event warning sign comprises one or more of the following: a date, a time, a duration, a watch area, and or future event warning sign. The method then moves to step 1708.

In step 1708, the method continues by retrieving the first responder resource need, and the threat level from the future event warning sign record associated with the generated one of the future event warning signs. The method then moves to step 1710.

In step 1710, the method continues by generating, by the server, for view and response by one or more first responders, a sentry duty task that comprises one or more of the following: the date, the watch area, or the duration. The method then moves to step 1712.

In step 1712, the method continues by scheduling, by the server, a first responder identification, of the first responder accepting the sentry duty task, if a first responder type of the first responder responding matches the first responder need of the sentry duty task. A first responder record comprises the first responder identification, the first responder type, and a payment account. The method then moves to step 1714.

In step 1714, upon executing the sentry duty task, the method continues by paying electronically the payment account of the first responder the pay amount when the first responder attends and performs the sentry duty task.

Figure 14:
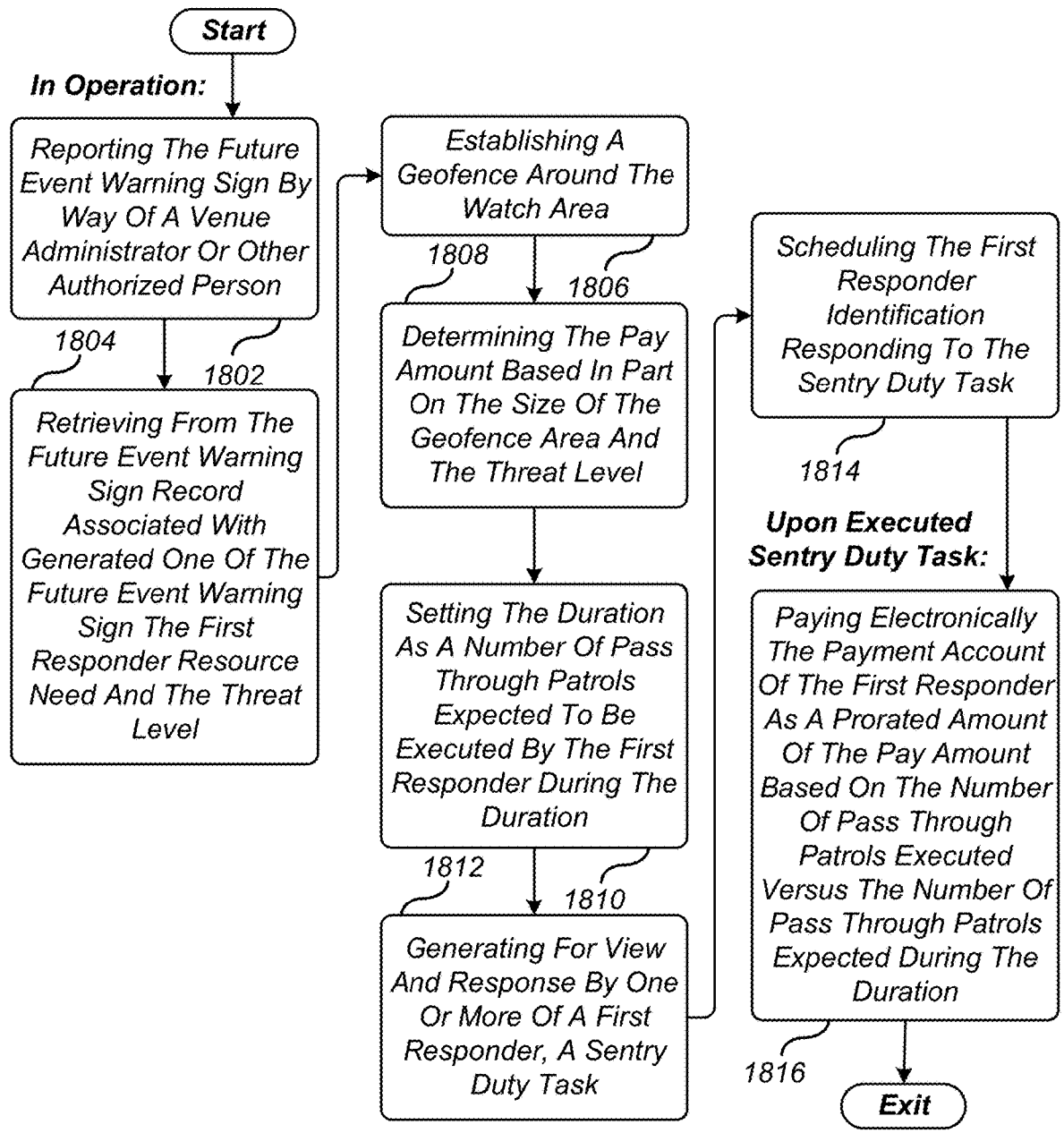

Referring to FIG. 14, there is illustrated one example of a method of assigning sentry duty tasks to off-duty first responders. In an exemplary embodiment, in operation, the method begins in step 1802 by reporting a future event warning sign, by way of a venue administrator 306 or another authorized person using a computing device that data communicates with the server 202. The future event warning sign comprises a date, a time, a duration, a watch area, and the future event warning sign. A future event warning sign record can comprise at least one of the future event warning signs and associated therewith at least one of a first responder resource need, and at least one of a threat level. The method then moves to step 1804.

In step 1804, the method continues by retrieving the first responder resource need, and the threat level, by the server, from the future event warning sign record associated with the future event warning sign. The method then moves to step 1806.

In step 1806, the method continues by establishing, by way of server 202, a geofenced area around the watch area. The method then moves to step 1808.

In step 1808, the method continues by determining the pay amount based in part on the size of the geofenced area, the type of the future event warning sign, and the threat level. The method then moves to step 1810.

In step 1810, the method continues by setting the duration as a number of pass-through patrols expected to be executed by the first responder during the duration. The method then moves to step 1812.

In step 1812, the method continues by generating, by the server, for view and response by one or more first responders, a sentry duty task that comprises the date, the watch area, the duration, the future event warning sign, the first responder need, the threat level, and a pay amount. The method then moves to step 1814.

In step 1814, the method continues by scheduling, by the server, a first responder identification, of the first responder accepting the sentry duty task, if a first responder type, of the first responder, responding matches the first responder need of the sentry duty task, a first responder record comprises the first responder identification, the first responder type, and a payment account. The method then moves to step 1816.

In step 1816, upon completing the sentry duty task, the method continues by paying electronically the pay account of the first responder, by the server, as a prorated amount of the pay amount based on the number of pass-through patrols executed by the first responder during the duration period versus the number of pass-through patrols expected to be executed by the first responder during the duration.

Figure 15:
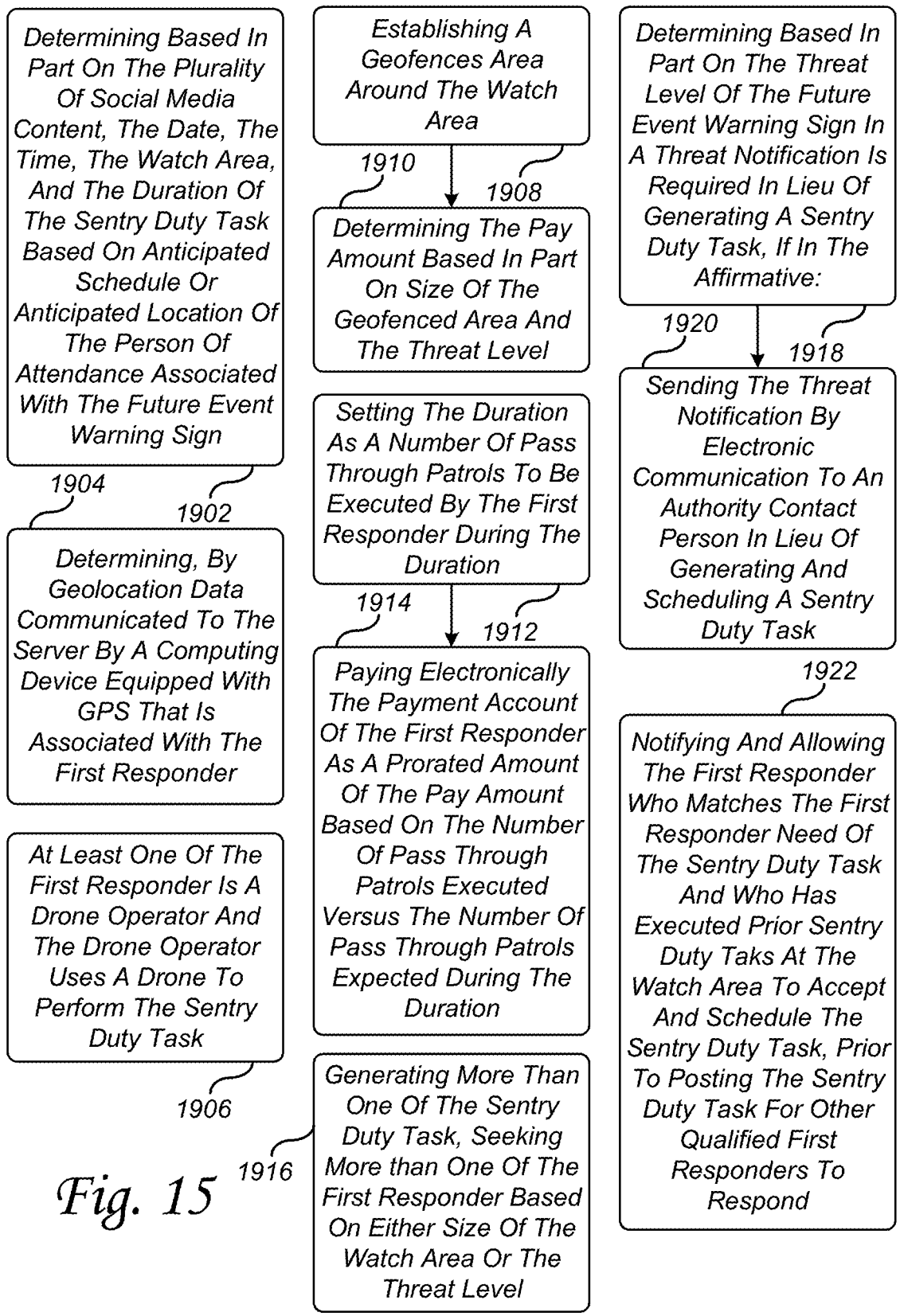
FIG. 15 illustrates exemplary embodiments that can be used interchangeably with the methods of the present invention.

Referring to FIG. 15, there are illustrated exemplary embodiments that can be used interchangeably with the methods of the present invention.

In step 1902, the methods can determine, by the server and based in part on the plurality of social media content 234, the date, the time, the watch area, and the duration of the sentry duty task based on the anticipated schedule or anticipated location of the person of attendance 304 associated with the future event warning sign.

In step 1904, the methods can determine, by geolocation data communicated to the server 202 by a computing device 232 equipped with a global position system (GPS) 216 that is associated with the first responder 306, that the first responder 306 was at the watch area 310 on the date, at the time, and for the duration as a condition before payment is effectuated.

In step 1906, at least one of the first responders 306 can be a drone operator and the drone operator uses a drone 316 to perform the sentry duty task.

In step 1908, the methods can establish, by the server, a geofenced area 308 around the watch area 310. Such geofenced area 308 can be determined by server 202 by knowing the GPS location of the watch area 310 and determining a perimeter at a desired distance around the watch area 310 as appropriate, or by other methods, as may be required and/or desired in a particular embodiment. Then in step 1910, the methods can determine, by server 202, the pay amount based in part on the size of the geofenced area 308, the type of the future event warning sign, the threat level, and other factors.

In step 1912, the methods can set the duration as a number of pass-through patrols 312 expected to be executed by the first responder 306 during the duration. And, in step 1914, the methods can pay, by the server 202, a prorated amount of the pay amount based on the number of pass-through patrols 312 executed by the first responder 306 during the duration period versus the number of pass-through patrols expected to be executed by the first responder 306 during the duration. In this regard, if the sentry duty task required 10 pass-through patrols 312 during the duration of the sentry duty task and the first responder only did 7 pass-through patrols 312 then the first responder 306 would only receive 70% of the pay amount.

In step 1916, the methods can generate, by the server 202, more than one sentry duty task, seeking more than one first responder 306 based on either the size of the watch area 310, the threat level, or other factors.

In step 1918, the methods can determine, by server 202, based in part on the threat level of the future event warning sign, if a threat notification is required in lieu of generating a sentry duty task and if affirmative, in step 1920, send the threat notification, by the server 202, by electronic communication, to an authority contact person 318 in lieu of generating and scheduling the sentry duty task. The future event warning sign record comprises, associated with determined one or more future event warning signs, at least one authority contact person 318.

In step 1922, the methods can notify and allow, by server 202, by electronic communication, the first responder 306 who matches the first responder need of the sentry duty task and who has executed a prior sentry duty task at the watch area 310 to accept and schedule the sentry duty task, prior to posting the sentry duty task for other qualified 306 first responder to respond. In this regard, the first responder 306 who has worked similar sentry duty tasks at the same watch area 310 and likely has built a relationship with the leaders at the watch area 310 can be first to accept newly posted sentry duty tasks before they are broadcast to a wider first responder 206 community.

Figure 16A:
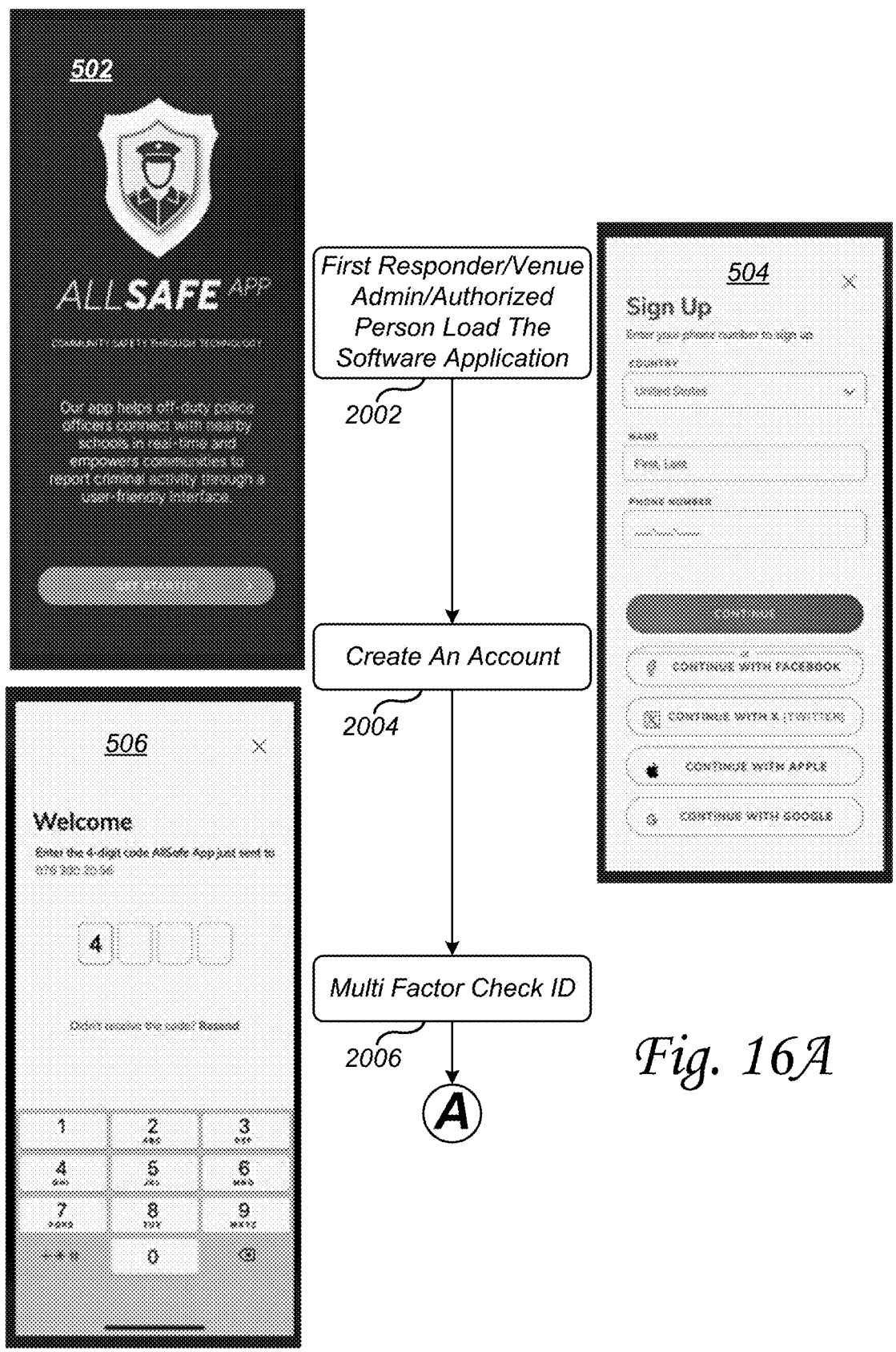

Referring to FIGS. 16A and 16B, there are illustrated examples of screenshots of a software application. In an exemplary embodiment, the present invention can be embodied in a software application that a user 302/306 and other authorized people can use. Referring to FIG. 16A, in screenshot 502, step 2002, first responders 306, venue administrators 302, and other authorized people can load the software application. In screenshot 504, step 2004 an account can be created. And, in screenshot 506, step 2006, a multi-factor check can be performed by sending a code or otherwise to the user and having them enter it as a way to verify the user before proceeding.

Continuing in FIG. 16B, In screenshot 508, step 2008, the user is prompted, as needed, to ensure GPS location services are turned on. In screenshots 510 and 512, step 2010, the user completes the preferences setup. And, in screenshot 514, step 2012, User information is collected to complete the account setup.

Referring to FIGS. 17A and 17B, there are illustrated examples of screenshots of a software application. Starting in FIG. 17A, in an exemplary embodiment, in screenshot 516, step 2014, venue administrators 302 or another authorized person can create a future warning event. Such future warning event can be created as a result of, in reference 'A', the venue administrator 302 seeing something happen, or in reference 'B' the venue administrator 302 preparing in advance to a watch area 310 need, or for other reasons, as may be required and/or desired in a particular embodiment. In screenshot 518, step 2016, a geofence can be created or otherwise established around the watch area 310, and a sentry duty task is generated.

Continuing in FIG. 17B, screenshot 520, step 2018, the first responder 306 provided his or her off-duty availability. And, in screenshot 522, step 2022, the first responder 306 can see, accept, and schedule sentry duty tasks that are available during their off-duty availability.

Figure 18:
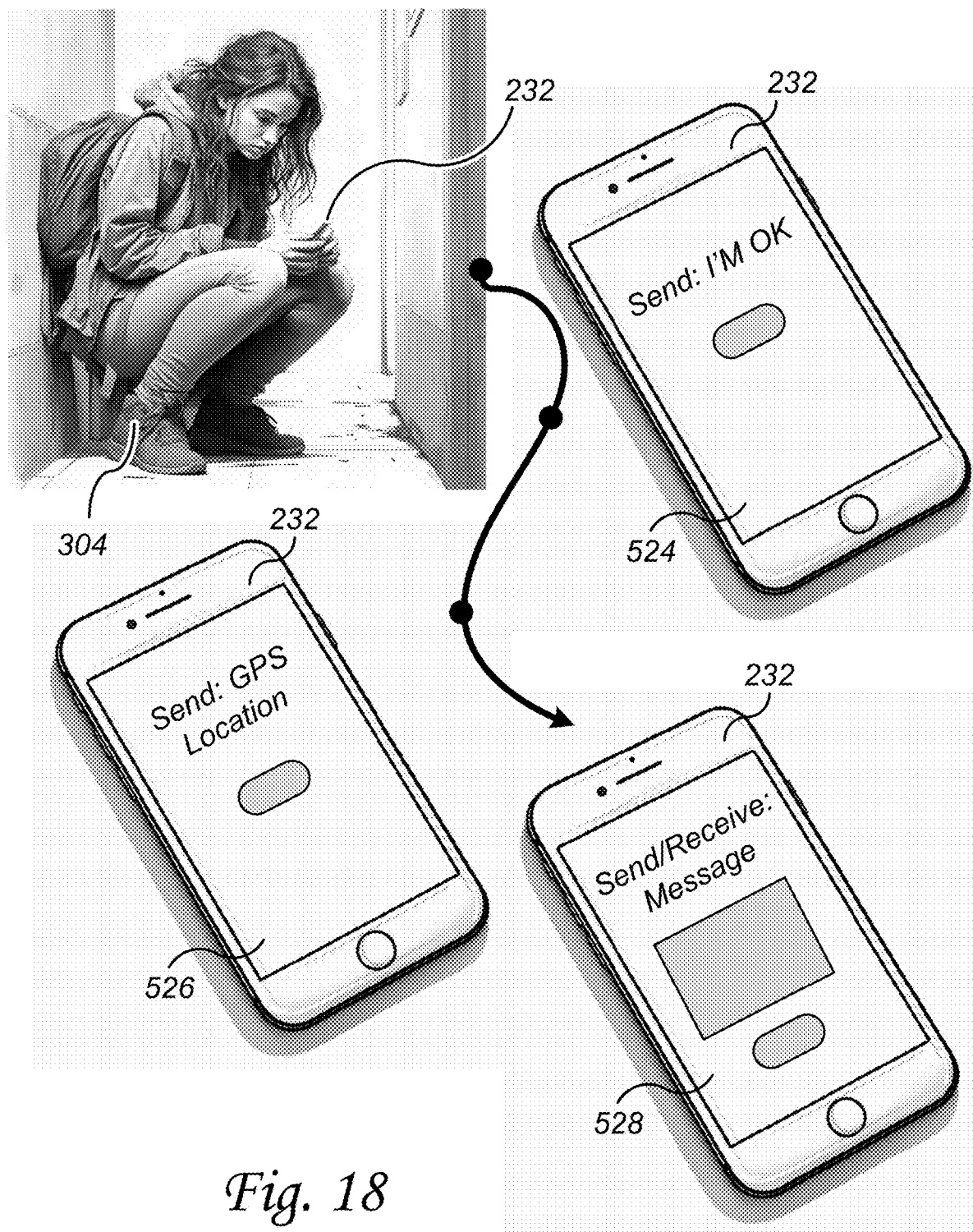
FIG. 18 illustrates one example of a person communicating during a crisis event.

Referring to FIG. 18, there is illustrated one example of person 304 communicating by way of computing device 232 during a crisis event. In an exemplary embodiment, a person 304 during a crisis event can use the present invention in screenshot 524 to send an I'M OK or other messages to parents/guardians, venue administrators 302, and other authorized users, as may be required and/or desired in a particular embodiment. In screenshot 526, person 304 can send their GPS location letting parents/guardians, venue administrators 302, and other authorized users know their location. And, in screenshot 528, person 304 and parents/guardians, venue administrators 302, and other authorized users can send and receive messages with the present invention, as may be required and/or desired in a particular embodiment.

An advantage, in the present invention, is the ability to implement several different revenue streams. In this regard, software subscriptions can be sold to various stakeholders, cross-selling and up-selling of products and services can be effectuated, advertisements can be implemented, business relationships with $3^{rd}$ party affiliates can be monetized, and other types and/or kinds of revenue streams can be implemented.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of assigning sentry duty tasks to off-duty first responders, the method comprising the steps of:
　entering and storing in a database, by way of a venue administrator or another one or more of an authorized person, at least one person of attendance into a watchful record, the watchful record comprising at least one of the person of attendance;
　in a first operation:
　　retrieving, by a server, a plurality of social media content from one or more social media platforms, the plurality of social media content is associated with one more persons of attendance in the watchful record, a future event warning sign record comprises at least one of a future event warning sign and associated therewith at least one of a first responder resource need, and at least one of a threat level;
　　analyzing the social media content and the future event warning sign record to detect one or more indicators associated with future events, the one or more indicators comprising attributes related to attendance, resources, and threat levels, wherein the server performs this analysis using predefined criteria stored in memory, and if the one or more indicators associated with future events are detected:
　　　generating, by the server, for view and response by one or more first responders, a sentry duty task that comprises one or more of the following: a date, a time, a duration, a watch area, the future event warning sign, the first responder need, the threat level, or a pay amount; and
　　　scheduling, by the server, a first responder identification of the first responder accepting the sentry duty task if a first responder type, of the first responder, responding, matches the first responder need of the sentry duty task, wherein a first responder record comprises the first responder identification, the first responder type, and a payment account;
　upon executing the sentry duty task by the first responder that is associated with the first operation:
　　tracking the first responder's attendance at the assigned watch area based on geofencing and task parameters stored in the system database;
　　adjusting task parameters dynamically based on changes in threat levels and the first responder's availability; and
　　paying, by the server, electronically, the payment account of the first responder the pay amount when the first responder attends and performs the sentry duty task.

2. The method in accordance with claim 1, further comprising the step of:
　determining, by the server and based in part on the plurality of social media content, the date, the time, the watch area, and the duration of the sentry duty task based on the anticipated schedule or anticipated location of the person of attendance associated with the future event warning sign.

3. The method in accordance with claim 1, the step of paying further comprising the step of:
　determining, by geolocation data communicated to the server by a computing device equipped with a global positioning system (GPS) that is associated with the first responder, that the first responder was at the watch area on the date, at the time, and for the duration as a condition before payment is effectuated, wherein the server uses predefined geofencing boundaries to validate the responder's presence.

4. The method in accordance with claim 1, wherein at least one of the first responder is a drone operator and the drone operator uses one or more drones to perform the sentry duty task, wherein the one or more drones assists in validating responder presence and collects dynamic data related to the watch area for surveillance as well as task adjustment, wherein the drone communicates the data back to the server in real-time using a wireless data connection.

5. The method in accordance with claim 1, further comprising the steps of:
　establishing, by the server, a geofenced area around the watch area; and
　determining, by the server, the pay amount based in part on the size of the geofenced area, type of the future event warning sign, and the threat level, wherein the pay amount is dynamically adjusted based on predefined factors related to threat levels and the first responder's recorded activity.

6. The method in accordance with claim 1, further comprising the steps of:
　setting the duration as a number of pass-through patrols expected to be executed by the first responder during the duration; and
　the step of paying further comprising the step of:
　　paying, by the server, a prorated amount of the pay amount based on the number of pass-through patrols executed by the first responder during the duration period versus the number of pass-through patrols expected to be executed by the first responder during the duration, wherein the number of pass-through patrols is tracked using geolocation data from the first responder's computing device.

7. The method in accordance with claim 1, further comprising the steps of:
　determining, by the server, prior to the step of generating, based in part on the threat level of the future event warning sign, if a threat notification is required in lieu of generating the sentry duty task and if affirmative:
　　sending the threat notification, by way of the server, by electronic communication, to an authority contact person in lieu of generating and scheduling the sentry duty task, the future event warning sign record comprises at least one of the authority contact person associated with the determined one or more of the future event warning sign, wherein the notification is stored in the database and used to log and initiate dynamically other informing processes.

8. The method in accordance with claim 1, the step of generating further comprising the step of:
　notifying and allowing, by the server, by electronic communication, the first responder who matches the first responder need of the sentry duty task and who has executed a prior sentry duty task at the watch area to accept and schedule the sentry duty task, prior to posting the sentry duty task for other qualified of the first responder to respond, wherein the first responder's response is recorded in the database to track task history.

9. The method in accordance with claim 1, the step of generating further comprising the step of:
generating, by the server, more than one of the sentry duty task, seeking more than one of the first responder based on either size of the watch area, or the threat level, wherein the server dynamically adjusts the first responder count based on dynamic threat levels and the first responder availability, wherein availability is determined by the first responder's current task status, proximity to the watch area, and their ability to respond within a specified time frame, wherein the availability is updated based on the first responder inputs and event monitoring.

10. The method in accordance with claim 1, further comprising the steps of:
in a second operation:
generating the future event warning sign using predictive analytics, by way of the venue administrator or another one or more of the authorized person using a computing device that data communicates with the server, the future event warning sign comprises one or more of the following: a future event date, a future event time, a future event duration, a future event watch area, or the future event warning sign;
retrieving the first responder resource need, and the threat level from the future event warning sign record associated with the generated one of the future event warning sign;
generating, by the server, for view and response by one or more of the first responder, the sentry duty task that comprises one or more of the following: the future event date, the future event watch area, the future event duration, the future event warning sign, the first responder need, the threat level, or the pay amount; and
scheduling, by the server, the first responder identification, of the first responder accepting the sentry duty task, if the first responder type of the first responder responding matches the first responder need of the sentry duty task;
upon executing the sentry duty task by the first responder that is associated with the second operation:
paying electronically the payment account of the first responder the pay amount when the first responder attends and performs the sentry duty task.

11. The method in accordance with claim 10, the step of paying further comprising the step of:
determining, by geolocation data communicated to the server by a second computing device equipped with a global positioning system (GPS) that is associated with the first responder, that the first responder was at the watch area on the date, at the time, and for the duration as a condition before payment is effectuated, wherein payment is dynamically adjusted based on the first responder's engagement with predefined task milestones, such as completion of patrols, surveillance activities, or incident reporting.

12. The method in accordance with claim 10, wherein at least one of the first responder is a drone operator and the drone operator uses a drone to perform the sentry duty task, and the drone provides dynamic data related to the watch area to adjust task scope.

13. The method in accordance with claim 10, further comprising the steps of:
establishing, by way of the server, a geofenced area around the watch area; and
determining the pay amount based in part on the duration of the task execution, the complexity of responder roles, and the number of first responders required, wherein the pay amount is dynamically adjusted during task execution based on real-time feedback regarding first responder performance, evolving task requirements, and resource utilization.

14. The method in accordance with claim 10, further comprising the steps of:
determining, by the server, prior to the step of generating, based in part on the threat level of the future event warning sign if a threat notification is required in lieu of generating a sentry duty task, and if affirmative:
initiating an escalation protocol that includes sending a threat notification, by the server, to a hierarchy of authority contacts based on the severity of the threat, wherein additional steps are taken to automatically trigger follow-up actions, such as surveillance requests, increased monitoring, or dispatching secondary first responders, based on real-time updates to the threat level.

15. The method in accordance with claim 10, the step of generating further comprising the step of:
notifying and allowing, by the server, by electronic communication, the first responder who matches the first responder need of the sentry duty task and who has executed a prior sentry duty task at the watch area to accept and schedule the sentry duty task, wherein the system prioritizes first responders based on their historical task performance, proximity to the watch area, or specific expertise, and provides a time-limited reservation window for the responder to accept the task before it is posted for other qualified first responders.

16. The method in accordance with claim 10, the step of generating further comprising the step of:
generating, by the server, more than one of the sentry duty task, seeking more than one of the first responder based on either size of the watch area, or the threat level, wherein task generation is dynamically adjusted based on real-time changes in threat levels.

17. The method in accordance with claim 1, further comprising the step of:
in a second operation:
reporting the future event warning sign, by way of the venue administrator or another one or more of the authorized person using a computing device that data communicates with the server, the future event warning sign comprises one or more of the following: a future event date, a future event time, a future event duration, a future event watch area, or the future event warning sign;
retrieving the first responder resource need, and the threat level, by the server, from the future event warning sign record associated with the future event warning sign;
establishing, by way of the server, a geofenced area around the watch area;
determining the pay amount based in part on size of the geofenced area, type of the future event warning sign, and the threat level;
setting the duration as a number of pass-through patrols expected to be executed by the first responder during the duration; and generating, by the server, for view and response by one or more of a first responder, a sentry duty task that comprises one or more of the following: the future event date, the future event watch area, the future event duration, the future event warning sign, the first responder need, the threat level, or the pay amount; and scheduling, by the server, the first responder identification, of the first responder accepting the sentry duty task, if the first responder type, of the first responder, responding matches the first responder need of the sentry duty task;

upon executing the sentry duty task by the first responder that is associated with the second operation:

paying electronically the payment account of the first responder, by the server, as a second prorated amount of the pay amount based on the number of pass-through patrols executed by the first responder during the duration period versus the number of pass-through patrols expected to be executed by the first responder during the duration.

18. The method in accordance with claim 17, the step of paying further comprising the step of:

determining, by geolocation data communicated to the server by a computing device equipped with a global positioning system (GPS) that is associated with the first responder, that the first responder was at the watch area on the date, at the time, and for the duration as a condition before payment is effectuated, wherein payment is adjusted based on the responder's adherence to predefined task milestones or completion of task-specific activities, and further incorporating sensor or drone feedback to verify task performance beyond mere presence.

* * * * *